(12) United States Patent
Noma

(10) Patent No.: US 10,719,185 B2
(45) Date of Patent: Jul. 21, 2020

(54) WIRING BOARD, POSITION INPUT DEVICE, POSITION INPUT FUNCTION-EQUIPPED DISPLAY PANEL, AND METHOD OF PRODUCING WIRING BOARD

(71) Applicant: Sharp Kabushiki Kaisha, Sakai, Osaka (JP)

(72) Inventor: Mikihiro Noma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/461,418

(22) PCT Filed: Dec. 7, 2017

(86) PCT No.: PCT/JP2017/043919
§ 371 (c)(1),
(2) Date: May 16, 2019

(87) PCT Pub. No.: WO2018/110398
PCT Pub. Date: Jun. 21, 2018

(65) Prior Publication Data
US 2019/0346951 A1  Nov. 14, 2019

(30) Foreign Application Priority Data

Dec. 14, 2016  (JP) .................... 2016-242106

(51) Int. Cl.
*G06F 3/047* (2006.01)
*G06F 3/041* (2006.01)
*G06F 3/044* (2006.01)

(52) U.S. Cl.
CPC .............. *G06F 3/047* (2013.01); *G06F 3/044* (2013.01); *G06F 3/0412* (2013.01)

(58) Field of Classification Search
CPC ................................ G06F 3/047; G06F 3/0412
See application file for complete search history.

(56) References Cited

U.S. PATENT DOCUMENTS

2015/0177879 A1* 6/2015 Misaki ................ H05K 1/0306
  345/174
2015/0212634 A1* 7/2015 Pyun .................... G06F 3/0412
  345/173

(Continued)

FOREIGN PATENT DOCUMENTS

JP    2013-214271 A    10/2013
JP    2016-508648 A    3/2016

(Continued)

OTHER PUBLICATIONS

Official Communication issued in International Patent Application No. PCT/JP2017/043919, dated Feb. 13, 2018.

*Primary Examiner* — Chun-Nan Lin
(74) *Attorney, Agent, or Firm* — Keating & Bennett, LLP

(57) ABSTRACT

A wiring board includes a substrate, a wire formed on a surface of the substrate, an inner-layer-side wire forming part forming the wire and made of a conductive material, and an outer-layer-side wire forming part forming the wire, disposed on an outer layer side relative to the inner-layer-side wire forming part and made of a conductive material different from and higher in light absorptance than the material of the inner-layer-side wire forming part.

13 Claims, 21 Drawing Sheets

(56) References Cited

U.S. PATENT DOCUMENTS

2015/0317014 A1* 11/2015 Miyake .................. G09G 5/003
                                                                     345/174
2017/0024040 A1*  1/2017 Nakayama .............. G06F 3/044

FOREIGN PATENT DOCUMENTS

| JP | 2016-099861 A | 5/2016 |
|----|---------------|--------|
| JP | 2016-194748 A | 11/2016 |
| JP | 2017-049826 A | 3/2017 |
| WO | 2015/174133 A1 | 11/2015 |
| WO | 2016/098268 A1 | 6/2016 |

* cited by examiner

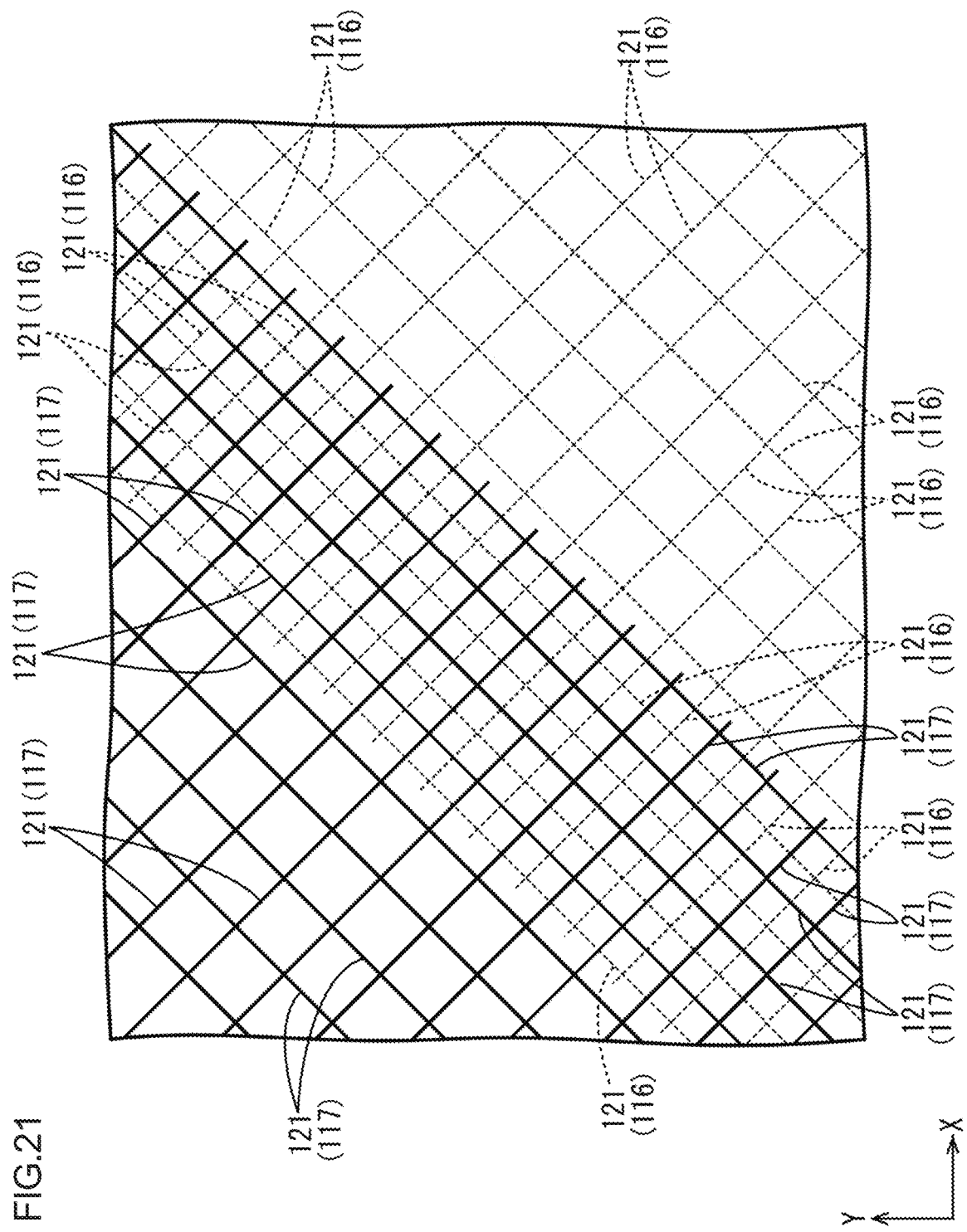

WIRING BOARD, POSITION INPUT DEVICE, POSITION INPUT FUNCTION-EQUIPPED DISPLAY PANEL, AND METHOD OF PRODUCING WIRING BOARD

TECHNICAL FIELD

The present invention relates to a wiring board, a position input device, a position input function-equipped display panel, and a method of producing a wiring board.

BACKGROUND ART

Recent years, a touchscreen is actively introduced into electronic devices including tablet laptop computers and mobile information terminals for the purpose of improving operability and usability. Patent Document 1 discloses an exemplary method of forming wires on a touchscreen. The method of forming touchscreen wires disclosed in Patent Document 1 includes: a step of providing an ultraviolet-cure resin layer by applying onto a transparent substrate; a step of forming an imprinted part by pressing, against the ultraviolet-cure resin layer, a nanoprinting plate provided with grooves formed of fine irregular shapes on its surface on the order of several hundred nanometers; and a step of filling the imprinted part with conductive ink.

RELATED ART DOCUMENT

Patent Document

Patent Document 1: Japanese Unexamined Patent Application Publication No. 2016-99861

Problem to be Solved by the Invention

According to the method of forming touchscreen wires disclosed in Patent Document 1, the touchscreen wires are formed of the conductive ink filling up the imprinted part. The conductive ink is conductive silver nanoparticle ink. That is, the touchscreen wires are made of a metal material, which present metal glossiness of a certain degree at the surface of the touchscreen wires. Therefore, extraneous light tends to be reflected at the surface of the touchscreen wires. This reflective light may let the user to visually recognize the touchscreen wires.

DISCLOSURE OF THE PRESENT INVENTION

The present invention has been made in view of the foregoing, and an object thereof is to render wires less noticeable.

Means for Solving the Problem

A wiring board of the present invention includes: a substrate; a wire formed on a surface of the substrate; an inner-layer-side wire forming part forming the wire and made of a conductive material; and an outer-layer-side wire forming part forming the wire, disposed on an outer layer side relative to the inner-layer-side wire forming part, and made of a conductive material different from and higher in light absorptance than the material of the inner-layer-side wire forming part.

Thus, the outer-layer-side wire forming part forming the wire and disposed on an outer layer side relative to the inner-layer-side wire forming part is made of a conductive material higher in light absorptance than the material of the inner-layer-side wire forming part. As compared to a case where the wire is formed of just the inner-layer-side wire forming part, the outer-layer-side wire forming part absorbs a greater amount of extraneous light becoming incident on the surface of the substrate. This reduces reflective light at the outer-layer-side wire forming part or reflective light attributed to light transmitting through the outer-layer-side wire forming part and reflected at the inner-layer-side wire forming part. That is, by virtue of the reduced reflective light at the wire, the wire becomes less noticeable.

As described above, while the outer-layer-side wire forming part is fully high in light absorptance, the outer-layer-side wire forming part may not be fully high in conductivity, for example, and may incur increased material cost. In this regard, the inner-layer-side wire forming part is made of a conductive material different from the material of the outer-layer-side wire forming part. This eliminates the necessity of taking into consideration of the light absorbing performance in selecting the material of the inner-layer-side wire forming part. Accordingly, the material of the inner-layer-side wire forming part can be freely selected, such as a highly conductive material or a cost-effective material. Thus, as compared to a case where the wire is formed of just the outer-layer-side wire forming part, the present invention is suitable in improving the conductivity of the wire or reducing the production costs.

The following configuration is preferable as an embodiment of the wiring board of the present invention.

(1) The substrate may have a multi layered structure including a base member and an imprint layer that is disposed on an outer layer side of the base member, and the imprint layer may have a wire forming groove part in which the wire is formed and that is recessed in a part of a surface of the imprint layer. In this manner, the wire is formed in the wire forming groove part that is recessed in a part of a surface of imprint layer disposed on the outer layer side of the base member. Accordingly, using the imprinting technique for example, the fine wire is arranged at a proper location in the surface of the substrate.

(2) The outer-layer-side wire forming part may contain at least a carbon-based conductive material. This improves conductivity and light absorbing performance of the outer-layer-side wire forming part.

(3) The inner-layer-side wire forming part may contain at least a metal material. This improves conductivity of the inner-layer-side wire forming part and minimizes the material costs.

A position input device of the present invention includes: the above-described wiring board; a position detecting electrode detecting, by a capacitance formed between the position detecting electrode and a position input element performing a position input in a surface of the substrate, an input position of the position input element. The wire forms at least the position detecting electrode.

With such a position input device, when a position input is performed in the surface of the substrate with the position input element, the position detecting electrode which forms a capacitance between itself and the position input element detects the input position of the position input element. Since the position detecting electrode is formed of the wire made up of the inner-layer-side wire forming part and the outer-layer-side wire forming part, the position detecting electrode is less likely to reflect extraneous light and therefore become less likely to be visually recognized. This improves the appearance of the position input device.

The following configuration is preferable as an embodiment of the position input device of the present invention.

(1) The position detecting electrode may include first position detecting electrodes arranged in a first direction extending along the surface of the substrate, and second position detecting electrodes arranged in a second direction extending along the surface of the substrate and crossing the first direction. The substrate may be provided with a first connection wire connecting between adjacent ones of the first position detecting electrodes in the first direction, and a second connection wire connecting between adjacent ones of the second position detecting electrodes in the second direction and disposed on an outer layer side relative to the first connection wire via an insulating film. The second connection wire may be made of a conductive material higher in light absorptance than the material of the inner-layer-side wire forming part. In this manner, the first position detecting electrodes arranged in the first direction are connected to each other with the first connection wire, and the second position detecting electrodes arranged in the second direction are connected to each other with the second connection wire. The second connection wire disposed on the outer layer side relative to the first connection wire via the insulating film is made of a conductive material higher in light absorptance than the material of the inner-layer-side wire forming part. Thus, as compared to a case where the second connection wire is made of a material identical to the material of the inner-layer-side wire forming part, the second connection wire absorbs a greater amount of extraneous light becoming incident on the surface of the substrate. This reduces the reflective light at the second connection wire and, consequently, the second connection wire becomes less noticeable.

(2) The second connection wire may be made of a material identical to the material of the outer-layer-side wire forming part. Since the second position detecting electrodes which are the connection target of the second connection wire are each formed of the wire made up of the outer-layer-side wire forming part and the inner-layer-side wire forming part, the second connection wire establishes a contact with the outer-layer-side wire forming part in each second position detecting electrode. By virtue of the second connection wire being made of a material identical to the material of the outer-layer-side wire forming part, an excellent contact state is established between them and, consequently, the contact resistance is minimized.

(3) The present embodiment may further include a peripheral wire connected to the position detecting electrode and disposed outside a region where the position detecting electrode is disposed in the surface of the substrate. The peripheral wire may be made of a material identical to the material of the second connection wire. Thus, the second connection wire and the peripheral wire can be formed in an identical step, which is suitable in reducing the production costs.

(4) The position detecting electrode may include first position detecting electrodes arranged in a first direction extending along the surface of the substrate, and second position detecting electrodes arranged in a second direction extending along the surface of the substrate and perpendicular to the first direction. The substrate may be provided with a first connection wire connecting between adjacent ones of the first position detecting electrodes in the first direction and formed of the wire identical to the first position detecting electrodes, and a second connection wire connecting between adjacent ones of the second position detecting electrodes in the second direction and formed of the wire identical to the second position detecting electrodes. The substrate may be made up of a first substrate provided with at least the first position detecting electrodes and the first connection wire, and a second substrate provided with at least the second position detecting electrodes and the second connection wire and fixed to the first substrate having its surface where the second position detecting electrodes and the second connection wire are provided opposed to one surface of the first substrate, the one surface being on a side opposite to a surface of the first substrate where the first position detecting electrodes and the first connection wire are provided. Thus, the first position detecting electrodes arranged in the first direction are connected to each other with the first connection wire, and the second position detecting electrodes arranged in the second direction are connected to each other with the second connection wire. The first position detecting electrodes and the first connection wire are both provided at the first substrate and formed of an identical wire. Similarly, the second position detecting electrodes and the second connection wire are both provided at the second substrate and made of an identical wire. Accordingly, extraneous light becoming incident on the surface of the first substrate is fully absorbed by the outer-layer-side wire forming part at the first position detecting electrodes and the first connection wire. Similarly, extraneous light becoming incident on the surface of the second substrate is fully absorbed by the outer-layer-side wire forming part at the second position detecting electrodes and the second connection wire. This reduces reflective light at the first position detecting electrodes, the first connection wire, the second position detecting electrodes, and the second connection wire. Therefore, the first position detecting electrodes, the first connection wire, the second position detecting electrodes, and the second connection wire become less noticeable. Additionally, the second substrate is fixed to the first substrate having its surface where the second position detecting electrodes and the second connection wire are provided opposed to one surface of the first substrate, which one surface is opposite to the surface where the first position detecting electrodes and the first connection wire are provided. This avoids short-circuiting between the first position detecting electrodes and the first connection wire and the second position detecting electrodes and the second connection wire. This improves flexibility in arranging the first position detecting electrodes, the first connection wire, the second position detecting electrodes, and the second connection wire. Therefore, for example, the first position detecting electrodes and the second position detecting electrodes may overlap with each other, and the necessity of separately providing an insulating film for preventing short-circuiting is eliminated.

A position input function-equipped display panel of the present invention includes at least: the above-described position input device; a first display substrate having a display surface where an image is displayed; and a second display substrate disposed so as to oppose to one surface of the first display substrate, the one surface being on a side opposite to the display surface. The first display substrate forms the substrate of the position input device and provided with the position detecting electrode on the display surface side.

The position input function-equipped display panel in this configuration allows the user to perform a position input in the surface of the display surface in accordance with an image displayed on the display surface of the first display substrate which is disposed so as to oppose to the second display substrate. By virtue of the provision of the position detecting electrode formed of the wire made up of the inner-layer-side wire forming part and the outer-layer-side wire forming part on the display surface side of the first display substrate, reflection of extraneous light at the position detecting electrode is minimized, whereby the position detecting electrode becomes less likely to be visually recognized. Hence, the display quality of an image displayed on the display surface improves.

The following configuration is preferable as an embodiment of the position input function-equipped display panel of the present invention.

(1) The position input function-equipped display panel may further include at least a polarizer having the position detecting electrode interposed between the polarizer and the first display substrate. Thus, the position detecting electrode is covered with the polarizer thereby prevented from exposure to the outside. This achieves protection of the position detecting electrode.

A method of producing a wiring board of the present invention includes at least: an inner-layer-side wire forming step of forming an inner-layer-side wire forming part made of a conductive material on a surface of a substrate; and an outer-layer-side wire forming step of forming an outer-layer-side wire forming part on an outer layer side relative to the inner-layer-side wire forming part made of a conductive material different from and higher in light absorptance than the material of the inner-layer-side wire forming part.

According to this method of producing a wiring board, the inner-layer-side wire forming part made of a conductive material is formed at the surface of the substrate in the inner-layer-side wire forming step, and the outer-layer-side wire forming part made of a conductive material different from and higher in light absorptance than the material of the inner-layer-side wire forming part is formed on the outer layer side relative to the inner-layer-side wire forming part in the subsequent outer-layer-side wire forming step. The outer-layer-side wire forming part formed through the outer-layer-side wire forming step is made of a conductive material higher in light absorptance than the material of the inner-layer-side wire forming part. Therefore, as compared to a case where just the inner-layer-side wire forming part is formed at the surface of the substrate, the outer-layer-side wire forming part absorbs a greater amount of extraneous light becoming incident on the surface of the substrate. This reduces reflective light at the outer-layer-side wire forming part or reflective light attributed to light transmitting through the outer-layer-side wire forming part and reflected at the inner-layer-side wire forming part. That is, by virtue of the reduced reflective light at the outer-layer-side wire forming part and the inner-layer-side wire forming part, the wire made up of the outer-layer-side wire forming part and the inner-layer-side wire forming part becomes less noticeable. As described above, while the outer-layer-side wire forming part is fully high in light absorptance, the outer-layer-side wire forming part may not be fully high in conductivity, for example, and may incur high material costs. In this regard, the inner-layer-side wire forming part is made of a conductive material different from the material of the outer-layer-side wire forming part. This eliminates the necessity of taking into consideration of the light absorbing performance in selecting the material of the inner-layer-side wire forming part. Accordingly, the material of the inner-layer-side wire forming part can be freely selected, such as a highly conductive material or a cost-effective material. Thus, as compared to a case where the wire is formed of just the outer-layer-side wire forming part, the present embodiment is suitable in improving the conductivity of the wire or reducing the production costs.

The following configuration is preferable as an embodiment of the method of producing a wiring board of the present invention.

(1) The method may further include at least: an imprint layer forming step of, preceding at least the inner-layer-side wire forming step, forming an imprint layer on an outer layer side of a base member forming the substrate; and a groove part forming step of forming a wire forming groove part having a surface of the imprint layer partially recessed. In the inner-layer-side wire forming step and the outer-layer-side wire forming step, the inner-layer-side wire forming part and the outer-layer-side wire forming part are each formed in the wire forming groove part. In this manner, in the imprint layer forming step, by the imprint layer being formed on the outer layer side of the base member, the substrate having a layered structure is obtained.

Subsequently, in the groove part forming step, by the surface of the imprint layer being partially recessed, the wire forming groove part is formed. Then, in the inner-layer-side wire forming step, after the inner-layer-side wire forming part is formed in the wire forming groove part, in the outer-layer-side wire forming step, the outer-layer-side wire forming part is formed in the wire forming groove part. Thus, using the imprinting technique for example, the fine wire is arranged at a proper location in the surface of the substrate.

(2) In the inner-layer-side wire forming step, the material of the inner-layer-side wire forming part may be the conductive material dissolved in a solvent. The method may further include at least a drying step of, subsequent to the inner-layer-side wire forming step and preceding the outer-layer-side wire forming step, evaporating the solvent contained in the material of the inner-layer-side wire forming part. Thus, in the inner-layer-side wire forming step, the inner-layer-side wire forming part is formed using the material which is a conductive material dissolved in a solvent. Thereafter, in the drying step, when the solvent contained in the material of the inner-layer-side wire forming part is evaporated, the volume of the material of the inner-layer-side wire forming part in the wire forming groove part is reduced. Therefore, a space is formed in the wire forming groove part. Accordingly, in the subsequent outer-layer-side wire forming step, using the space formed in the wire forming groove part, the outer-layer-side wire forming part is formed in a self-aligning manner. Thus, the outer-layer-side wire forming part is disposed easily and surely on the outer layer side relative to the inner-layer-side wire forming part.

Advantageous Effect of the Invention

The present invention renders the wire less noticeable.

BRIEF DESCRIPTION OF THE DRAWINGS

FIG. 21 is an enlarged plan view of a portion where the first touch electrodes and the second touch electrodes overlap with each other.

MODES FOR CARRYING OUT THE INVENTION

First Embodiment

With reference to FIGS. 1 to 16, a description will be given of a first embodiment of the present invention. In the present embodiment, a description will be given of a liquid crystal display device 10 having a touchscreen function. Part of each drawing shows X axis, Y axis, and Z axis, according to which directions of the drawings are indicated. The top-bottom direction should be referred to FIGS. 2, 6, 7 and others. Furthermore, in FIGS. 2, 6, 7 and others, the top side is the front side, and the bottom side is the back side.

Figure 1:
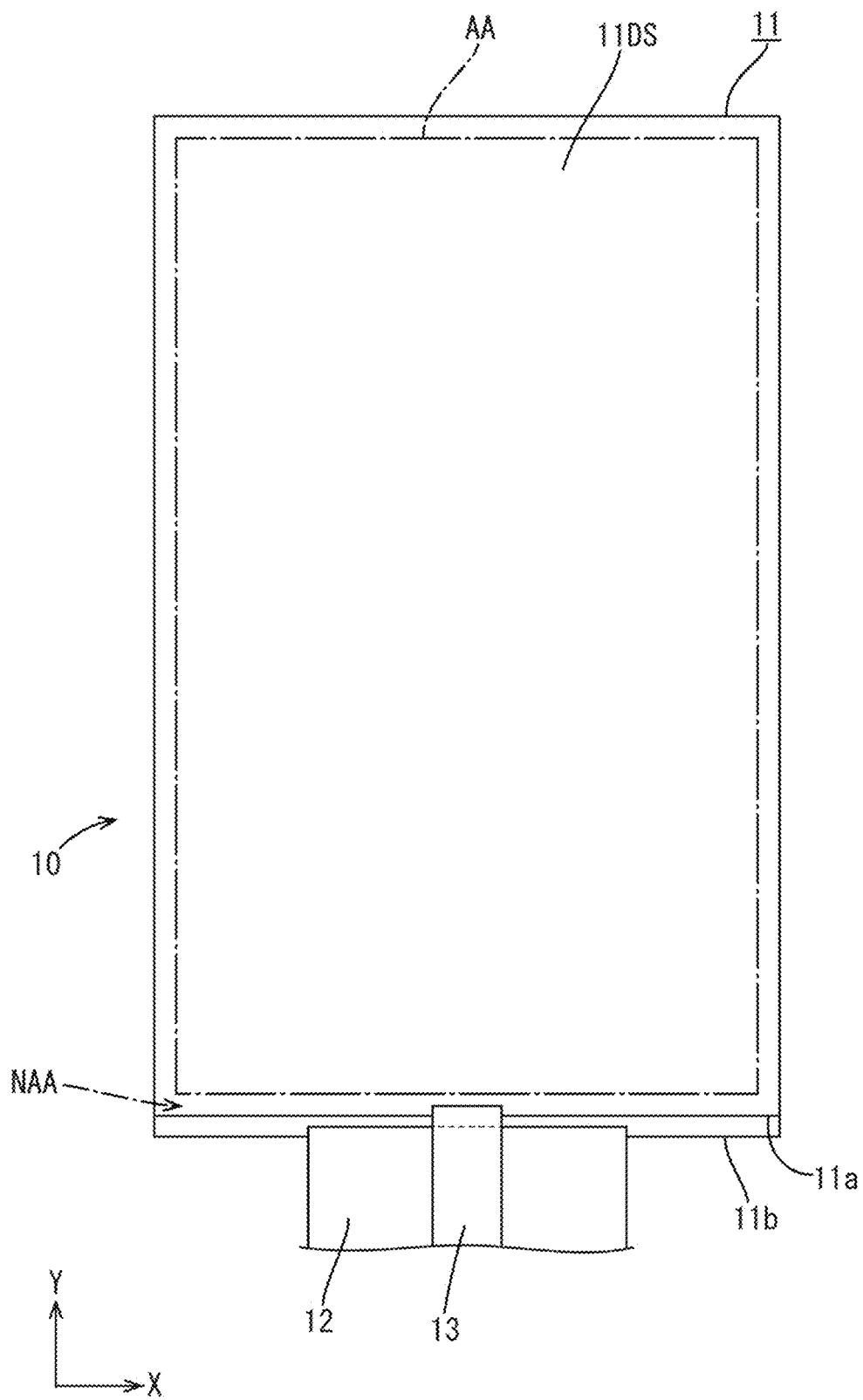
FIG. 1 is a plan view of a liquid crystal panel according to a first embodiment of the present invention.
Figure 2:
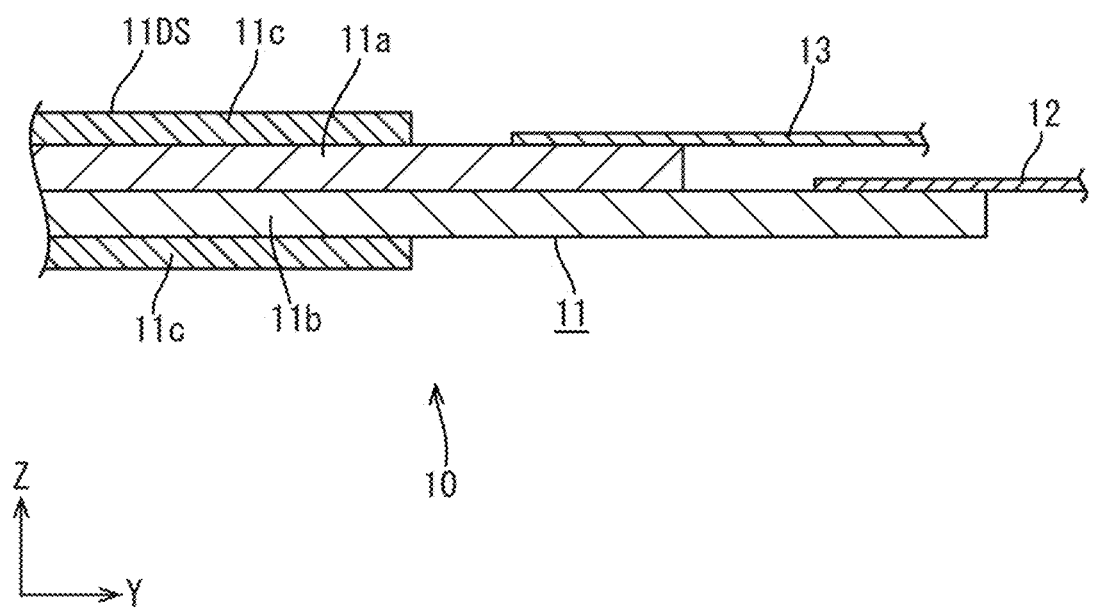
FIG. 2 is a cross-sectional view of the liquid crystal panel.

First, a description will be given of the configuration of the liquid crystal display device 10. As shown in FIGS. 1 and 2, the liquid crystal display device 10 has a vertically elongated quadrangular shape, and includes at least: a liquid crystal panel (position input function-equipped display panel) 11 including, at its front surface, a display surface 11DS configured to display an image; a display-dedicated flexible printed circuit board 12 connected to the liquid crystal panel 11; a touchscreen-dedicated flexible printed circuit board 13 connected to the liquid crystal panel 11; and a backlight device (not shown) emitting illumination light for display onto the liquid crystal panel 11. In the liquid crystal display device 10 according to the present embodiment, the liquid crystal panel 11 measures about 70 inches to 100 inches, for example, which is generally regarded as a large-size screen or a super-large-size screen.

As shown in FIG. 2, the liquid crystal panel 11 includes: a substantially transparent pair of substrates 11a, 11b being bonded to each other with a predetermined gap (the cell gap) between them; and a liquid crystal enclosed between the substrates 11a, 11b. In the pair of substrates 11a, 11b, an array substrate (second display substrate, active matrix substrate) lib disposed on the back side is provided with structures including switching elements (e.g., TFTs) connected to source lines and gate lines which are perpendicular to each other, pixel electrodes connected to the switching elements, and an alignment film. The array substrate lib includes a glass substrate on which these structures are formed. On the other hand, a CF substrate (first display substrate, wiring board, position input device, counter substrate) 11a disposed on the front side is provided with a color filter in which color parts such as R (red), G (green), and B (blue) are arranged in a predetermined arrangement, and a light shielding part (a black matrix) partitioning between adjacent ones of the color parts. The CF substrate 11a further includes structures such as a common electrode, an alignment film and the like. Onto the pair of outer surfaces of the substrates 11a, 11b, a front and back pair of polarizers 11c are respectively bonded. The surface of the polarizer 11c bonded onto the front side of the CF substrate 11a forms a display surface 11DS.

As shown in FIG. 1, the long side dimension of the CF substrate 11a is shorter than the long side dimension of the array substrate 11b. The CF substrate 11a is bonded to the array substrate 11b having its one end in the long side direction aligned with that of the array substrate 11b. Accordingly, another end in the long side direction of the array substrate 11b extends in the side direction relative to the CF substrate 11a. To the extending part, a display-dedicated flexible printed circuit board 12 which will be described later is connected. As shown in FIG. 1, the display surface 11DS in the liquid crystal panel 11 is divided into a display region (active area) AA where an image is displayed, and a non-display region (non-active area) NAA formed frame-like (rim-like) to surround the display region AA and where no image is displayed. Note that, in FIG. 1, a dot-and-dash line represents the outer shape of the display region AA, and the region outer than the dot-and-dash line is the non-display region NAA.

As shown in FIG. 1, the display-dedicated flexible printed circuit board 12 and the touchscreen-dedicated flexible printed circuit board 13 are flexible for their each including a film-like base member made of a synthetic resin material (e.g., polyimide-based resin). On the base member, a multitude of wirings (not shown) are formed. The display-dedicated flexible printed circuit board 12 has its one end connected to the array substrate 11b forming the liquid crystal panel 11, and has its other end connected to a control board (not shown) which is a signal supply source, and thus is configured to send any signal relating to image display supplied from the control board to the array substrate 11b. On the other hand, the touchscreen-dedicated flexible printed circuit board 13 has its one end connected to the CF substrate 11a forming the liquid crystal panel 11, and has its other end connected to the control board (not shown), and thus is configured to send any signal relating to a position detection supplied from the control board to the CF substrate 11a. The CF substrate 11a and the array substrate 11b are provided with, at their respective ends, terminal parts (not shown) connected to the end of the touchscreen-dedicated flexible printed circuit board 13 and that of the display-dedicated flexible printed circuit board 12.

Figure 3:
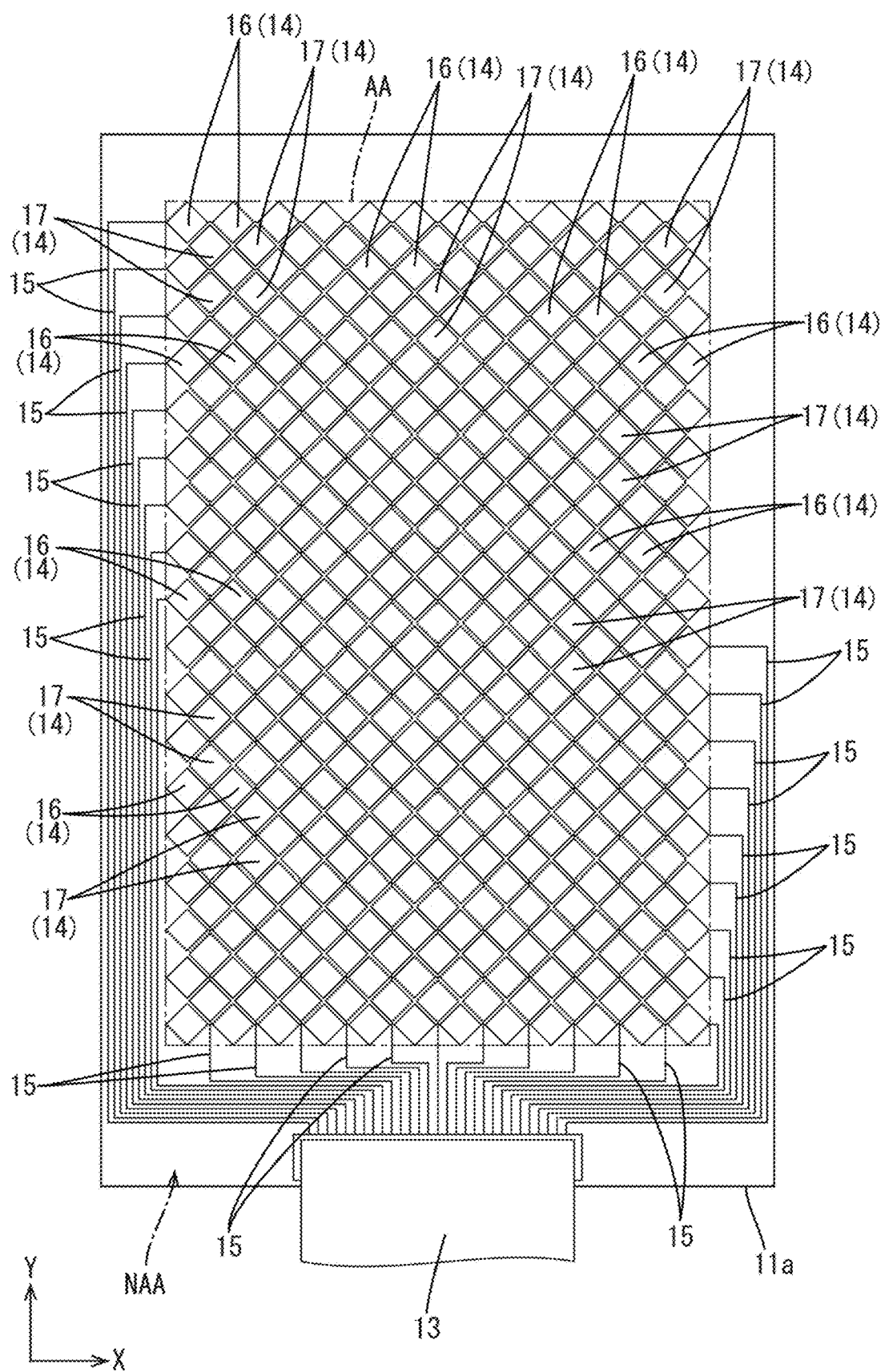
FIG. 3 is a plan view of a CF substrate forming the liquid crystal panel.

As described above, the liquid crystal panel 11 according to the present embodiment has both the display function of displaying an image, and the touchscreen function (the position input function) of detecting a position where the user inputs (an input position) in accordance with the displayed image. Here, a touchscreen pattern for exhibiting the touchscreen function is integrated in the liquid crystal panel 11 (the on-cell approach). This touchscreen pattern employs a so-called projected capacitive scheme, and the detecting scheme thereof is the mutual capacitive scheme. As shown in FIG. 3, the touchscreen pattern is provided at the CF substrate 11a out of the pair of substrates 11a, 11b, and includes at least touch electrodes (position detecting electrodes) 14 arranged in matrix within the surface of the display surface 11DS in the CF substrate 11a. The touch electrodes 14 are disposed at the display region AA in the CF substrate 11a. Accordingly, the display region AA in the liquid crystal panel 11 substantially agrees with the touch region where any input position can be detected, and the non-display region NAA substantially agrees with the non-touch region where no input position can be detected. In the non-display region NAA in the CF substrate 11a which is the non-touch region positioned outside the touch region, peripheral wires 15 are disposed having their respective one ends connected to the touch electrodes 14 and their respective other ends connected to terminal parts connected to the touchscreen-dedicated flexible printed circuit board 13. When the user brings his/her finger (a position input element), which is a conductor and not shown, close to the display surface 11DS in an attempt to input the position in accordance with a visually-recognized image on the display region AA, a capacitance is formed between the finger and the touch electrode 14. Thus, at the touch electrode 14 near the finger, a change occurs in the detected capacitance attributed to the approaching finger, that is, a difference occurs between the touch electrode 14 near the finger and the touch electrodes 14 far from the finger. The input position is detected on the basis of this difference.

Figure 4:
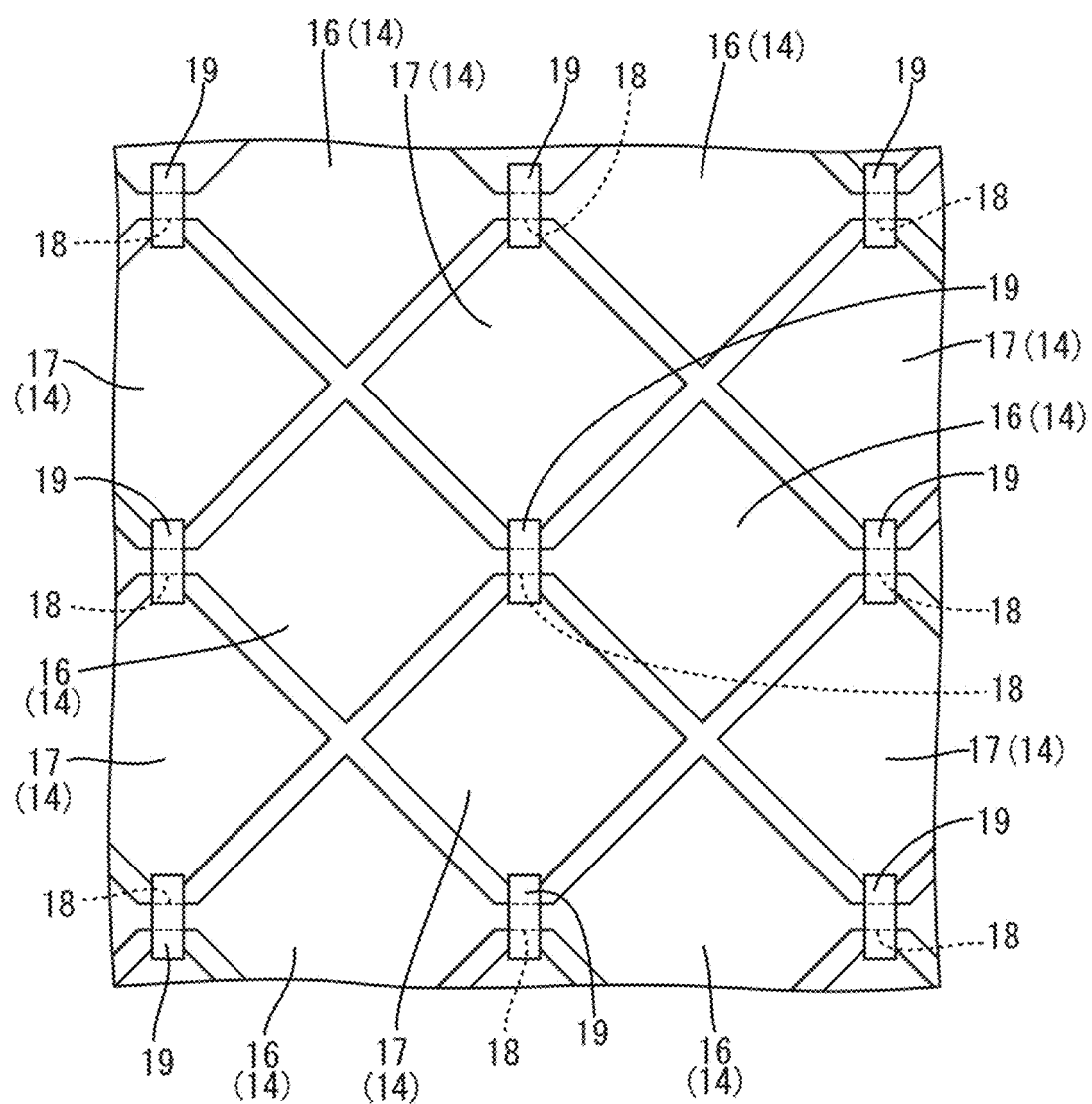
FIG. 4 is a plan view of a touchscreen pattern disposed at the display surface of the CF substrate.

In more detail, as shown in FIG. 3, the touch electrodes 14 include first touch electrodes (first position detecting electrodes) 16 linearly arranged in the X-axis direction (the first direction) and second touch electrodes (second position detecting electrodes) 17 linearly arranged in the Y-axis direction (the second direction) perpendicular to (crossing) the X-axis direction. The first touch electrodes 16 and the second touch electrodes 17 each have a substantially rhombic planar shape, and arranged to two-dimensionally fill the display surface 11DS in the CF substrate 11a. The first touch electrodes 16 and the second touch electrodes 17 each have a diagonal dimension of about 5 mm, for example. As shown in FIG. 4, between the first touch electrodes 16 adjacent to each other in the X-axis direction, a first connection wire 18 is interposed. This first connection wire 18 electrically connects between adjacent ones of the first touch electrodes 16. The first connection wires 18 are juxtaposed to each other intermittently at an interval approximately as wide as the dimension of each first touch electrode 16 in the X-axis direction. The first connection wires 18 extend in the X-axis direction each between adjacent ones of the first touch electrodes 16. On the other hand, between the second touch electrodes 17 adjacent to each other in the Y-axis direction, the second connection wire 19 is interposed. This second connection wire 19 electrically connects between adjacent ones of the second touch electrodes 17. The second connection wires 19 are juxtaposed to each other intermittently at an interval approximately as wide as the dimension of each second touch electrode 17 in the Y-axis direction. The second connection wires 19 extend in the Y-axis direction between adjacent ones of the second touch electrodes 17. The opposite ends of the second connection wires 19 in the extending direction (the Y-axis direction) are respectively connected to the second touch electrodes 17 which are the connection target. The extending direction of the second connection wires 19 is perpendicular to and overlap with as seen in a plan view with the extending direction of the first connection wires 18.

Figure 5:
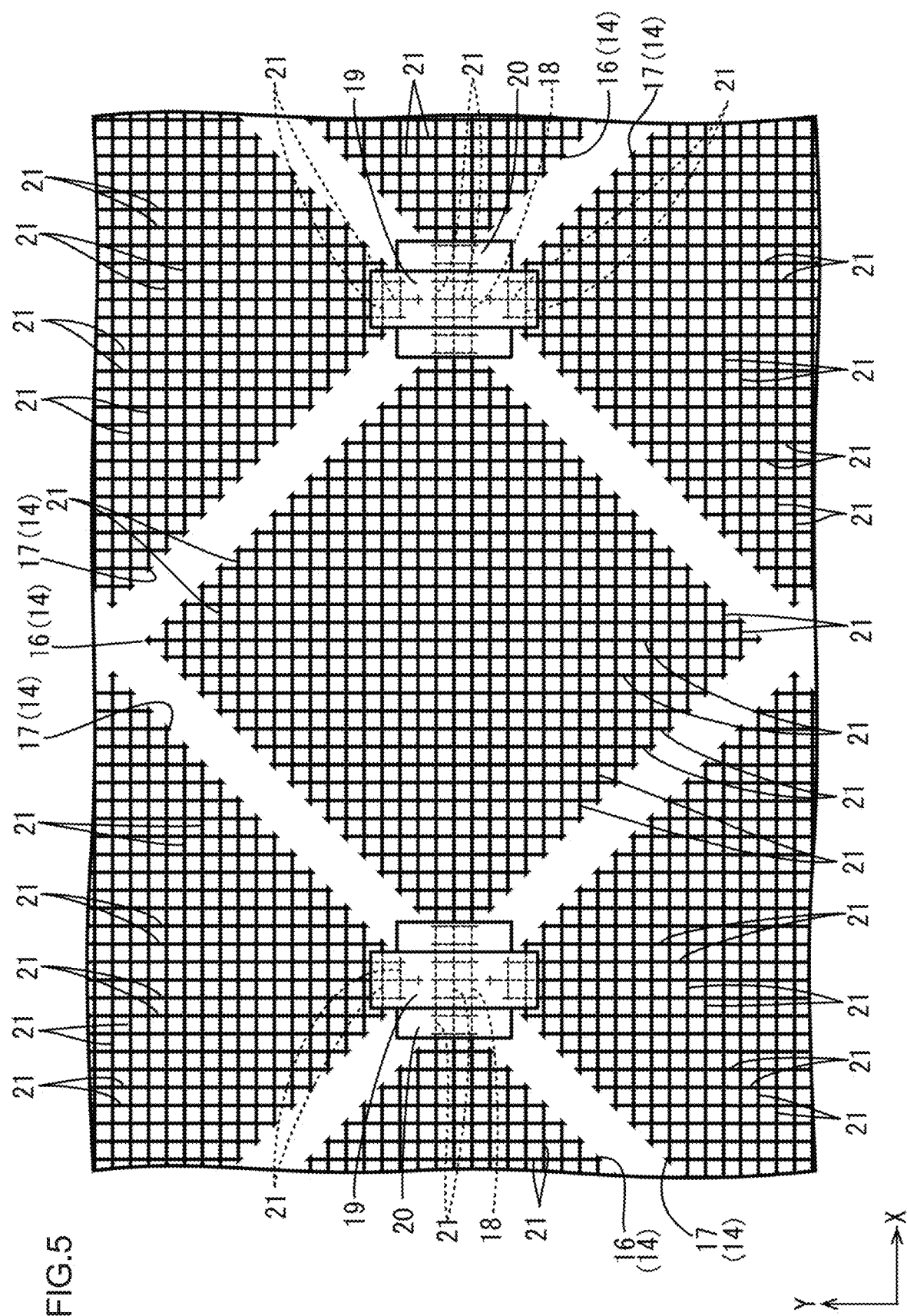
FIG. 5 is an enlarged plan view of position detecting electrodes forming the touchscreen pattern.
Figure 7:
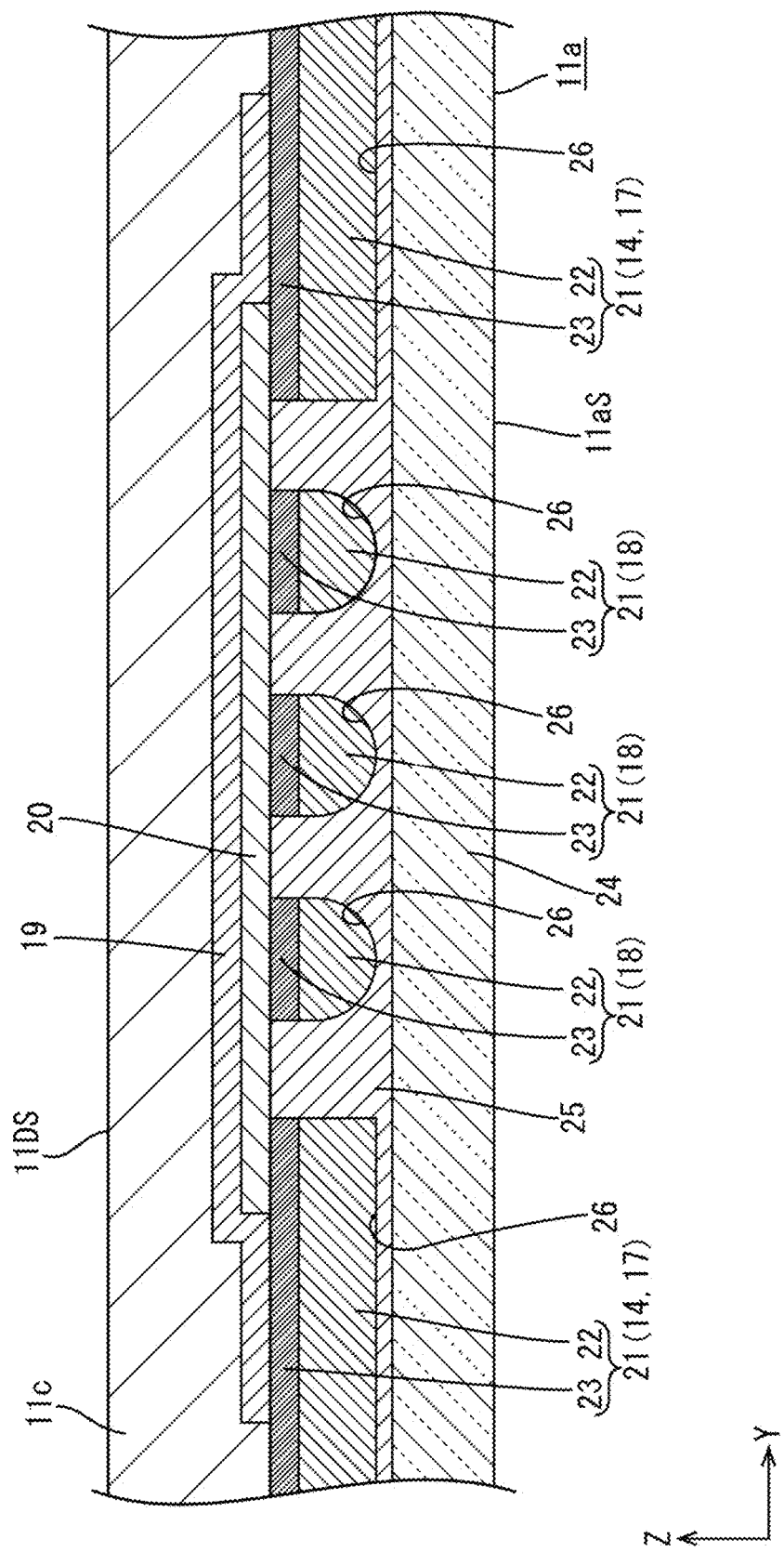
FIG. 7 is a cross-sectional view of a first connection wire and a second connection wire.

As shown in FIGS. 5 and 7, between the first connection wire 18 and the second connection wire 19 overlapping with each other, an insulating film 20 is interposed in the Z-axis direction. The insulating film 20 prevents short-circuiting between the first connection wire 18 and the second connection wire 19. The insulating film 20 is provided at least at a range where the first connection wires 18 and the second connection wires 19 overlap with each other, while avoiding overlap with the opposite ends of the second connection wire 19 in the Y-axis direction. This formation range of the insulating film 20 allows the second connection wires 19 and the second touch electrodes 17 to be electrically connected to each other. As described above, by the first touch electrodes 16 arranged in the X-axis direction being connected to each other by the first connection wires 18, groups of the first touch electrodes 16 in rows in the X-axis direction are formed. These groups of first touch electrodes 16 in rows detect any input position in the Y-axis direction. On the other hand, by the second touch electrodes 17 arranged in the Y-axis direction connected to each other by the second connection wires 19, groups of the second touch electrodes 17 in columns in the Y-axis direction are formed. These groups of second touch electrodes 17 detect any input position in the X-axis direction. Thus, any input position in the X-axis direction and the Y-axis direction is specified. As shown in FIG. 3, the peripheral wires 15 include those connected to the first touch electrodes 16 on the ends in the X-axis direction out of the groups of first touch electrodes 16, and those connected to the second touch electrodes 17 on the end (the end on the touchscreen-dedicated flexible printed circuit board 13 side) in the Y-axis direction out of the groups of second touch electrodes 17.

Figure 6:
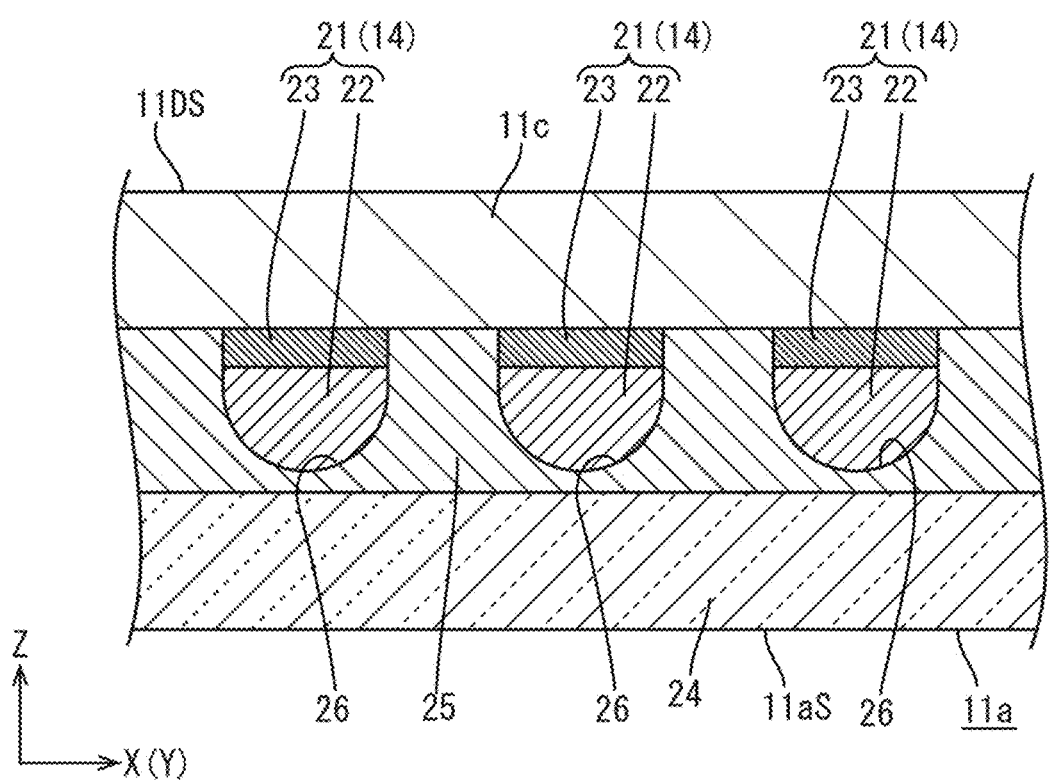
FIG. 6 is a cross-sectional view of the position detecting electrodes.

As shown in FIGS. 5 and 6, the touch electrodes 14 forming the touchscreen pattern in the foregoing manner are formed of wires 21 provided at the surface of the CF substrate 11a. The wires 21 are formed at the touch region on the surface of the CF substrate 11a, which surface is on the display surface 11DS side and opposite to the array substrate 11b side, to form at least the touch electrodes 14. In more detail, the wires 21 each have a width of, for example, about 3 μm, and include those linearly extending in the X-axis direction and those linearly extending in the Y-axis direction. The wires 21 linearly extending in the X-axis direction are arranged in parallel to one another at a certain interval from one another in the Y-axis direction, and the wires 21 linearly extending in the Y-axis direction are arranged in parallel to one another at a certain interval from one another in the X-axis direction. Thus, the group of wires 21 is arranged mesh-like in the formation range of the touch electrodes 14. The wires 21 crossing each other are electrically short-circuited.

As shown in FIG. 6, the wires 21 are each formed of an inner-layer-side wire forming part 22 and an outer-layer-side wire forming part 23 disposed on the outer layer side (the side on which extraneous light becomes incident) relative to the inner-layer-side wire forming part 22. The inner-layer-side wire forming part 22 occupies most of the thickness of each wire 21, whereas the outer-layer-side wire forming part 23 is formed by a slight thickness on the outer layer side of the wire 21 so as to cover the inner-layer-side wire forming part 22. The main material of the inner-layer-side wire forming part 22 is dried and cured metal ink (e.g., silver nanoparticle ink) containing a highly conductive metal material (e.g., silver). The conductivity of the material of the inner-layer-side wire forming part 22 is higher than the material of the outer-layer-side wire forming part 23. The material of the inner-layer-side wire forming part 22 is higher in light reflectivity than the material of the outer-layer-side wire forming part 23. Thus, glossiness appears on the surface of the inner-layer-side wire forming part 22. On the other hand, the main material of the outer-layer-side wire forming part 23 is dried and cured carbon-based ink (e.g., carbon nanotube ink) containing a carbon-based conductive material (e.g., carbon nanotube) whose surface is black and exhibits high light absorbing performance (light shielding performance) and conductivity. The material of the outer-layer-side wire forming part 23 is higher in light absorptance (light shielding performance) than the material of the inner-layer-side wire forming part 22. The material of the outer-layer-side wire forming part 23 is lower in light reflectivity than the material of the inner-layer-side wire forming part 22. Thus, glossiness hardly appears on the surface of the outer-layer-side wire forming part 23, and the outer-layer-side wire forming part 23 appears black and matte. In this manner, the outer-layer-side wire forming part 23 disposed on the outer layer side (the side on which extraneous light becomes incident) relative to the inner-layer-side wire forming part 22 is made of a conductive material higher in light absorptance than the inner-layer-side wire forming part 22. Therefore, as compared to a case where each wire is formed of just the inner-layer-side wire forming part 22, the outer-layer-side wire forming part 23 absorbs a greater amount of extraneous light becoming incident on the surface of the CF substrate 11a. This reduces reflective light at the outer-layer-side wire forming part 23 or reflective light attributed to light transmitting through the outer-layer-side wire forming part 23 and reflected at the inner-layer-side wire forming part 22. That is, by virtue of the reduced reflective light at the wires 21, the wires 21 become less noticeable and, consequently, the touch electrodes 14 formed by the wires 21 become less likely to be visually recognized by the user. This improves the appearance of the liquid crystal display device 10 and the display quality of any image displayed on the display surface 11DS. On the other hand, as described above, while the outer-layer-side wire forming part 23 is fully high in light absorptance, the outer-layer-side wire forming part 23 may not be fully high in conductivity, for example, and may incur increased material costs. In this regard, the inner-layer-side wire forming part 22 is made of a conductive material different from the material of the outer-layer-side wire forming part 23. This eliminates the necessity of taking into consideration of the light absorbing performance in selecting the material of the inner-layer-side wire forming part 22. Accordingly, the material of the inner-layer-side wire forming part 22 can be freely selected, such as a highly conductive material or a cost-effective material. Thus, as compared to a case where the wires are formed of just the outer-layer-side wire forming part 23, the present embodiment is suitable in improving the conductivity of the wires 21 or reducing the production costs.

As shown in FIG. 6, the CF substrate 11a provided with the wires 21 each include a substrate 11aS made up of a glass substrate (base member) 24 and an imprint layer 25 disposed on the surface of the glass substrate 24 (on the outer layer side), which surface is on the side opposite to the surface where the color filters and the like are formed. The glass substrate 24 forming the substrate 11aS is, for example, made of glass having a thickness of about 0.57 mm, for example. The imprint layer 25 forming the substrate 11aS is solidly layered over at least the entire touch region (the formation range of the touch electrode 14) in the surface of the glass substrate 24, and made of, for example, an ultraviolet-cure resin material. The imprint layer 25 is provided with wire forming groove parts 26 where the surface of the imprint layer 25 is partially recessed to form the wires 21. The wire forming groove parts 26 are provided at the surface of the imprint layer 25 by a so-called imprinting technique. The formation range of the wire forming groove parts 26 as seen in a plan view in the surface of the CF substrate 11a agrees with the formation range of the wires 21. In more detail, the wire forming groove parts 26 each have a width of about 3 μm for example, and include those linearly extending in the X-axis direction and those linearly extending in the Y-axis direction. The wire forming groove parts 26 linearly extending in the X-axis direction are arranged in parallel to one another at a certain interval in the Y-axis direction, and the wire forming groove parts 26 linearly extending in the Y-axis direction are arranged in parallel to one another at a certain interval in the X-axis direction. Thus, the group of wire forming groove parts 26 is arranged mesh-like in the formation range of the touch electrodes 14. The wire forming groove parts 26 crossing each other are electrically connected to each other. Accordingly, in forming the wires 21 at the surface of the CF substrate 11a, in each wire forming groove part 26 previously formed at the imprint layer 25 forming the substrate 11aS of the CF substrate 11a, the inner-layer-side wire forming part 22 and the outer-layer-side wire forming part 23 should be successively formed. In this manner, by virtue of the wire forming groove parts 26 previously partitioning the formation range of the wires 21, the fine wires 21 are arranged at proper locations in the display surface 11DS of the CF substrate 11a. Further, while it is preferable that the outer surface of the wires 21 formed in the wire forming groove parts 26 be flush with the outermost surface of the CF substrate 11a in view of securing the flatness, this is not essential.

As shown in FIGS. 5 and 7, the wires 21 also form the first connection wires 18 each connecting between adjacent ones of the first touch electrodes 16. That is, by the wires 21 each being provided at the formation range of the first connection wire 18 (the portion between adjacent ones of the first touch electrodes 16 in the X-axis direction) on the surface of the CF substrate 11a on the display surface 11DS side, the wires 21 form the first connection wires 18 and are continuous to the wires 21 forming adjacent ones of the first touch electrodes 16. The second connection wires 19 are mainly made of dried and cured carbon-based ink (e.g., carbon nanotube ink) containing a carbon-based conductive material (e.g., carbon nanotube) exhibiting high light absorbing performance (light shielding performance) and conductivity. The material of the second connection wires 19 is higher in light absorptance (light shielding performance) than the material of the inner-layer-side wire forming part 22. Preferably, the second connection wires 19 include, as the main material, the carbon-based conductive material which is similarly included in the outer-layer-side wire forming part 23. The material of the second connection wire 19 is lower in light reflectivity than the material of the inner-layer-side wire forming part 22. Thus, no glossiness appears on the surface of the second connection wire 19, and the surface thereof appears matte. The second connection wires 19 are disposed on the outer layer side (the side on which extraneous light becomes incident) relative to the first connection wire 18 via the insulating film 20 and exposed directly to extraneous light. Here, by virtue of the second connection wires 19 are made of the material exhibiting high light absorptance, the second connection wires 19 fully absorb the extraneous light. This reduces any reflective light at the second connection wires 19. Accordingly, in addition to the first touch electrodes 16 and the second touch electrodes 17, the second connection wires 19 also become less noticeable. Furthermore, by virtue of the second connection wires 19 being made of the material identical to that of the outer-layer-side wire forming parts 23 forming the wires 21, the contact state relative to the outer-layer-side wire forming part 23 in the wire 21 of the second touch electrode 17 which is the connection target improves and, consequently, the contact resistance is minimized.

As shown in FIG. 3, the peripheral wires 15 disposed outside the touch region within the display surface 11DS of the CF substrate 11a are made of the material identical to that of the second connection wires 19. That is, the peripheral wires are made of the material identical to that of the outer-layer-side wire forming part 23 forming each wire 21, and therefore fully absorb extraneous light. This reduces the reflective light at the peripheral wires 15. Therefore, in addition to the first touch electrodes 16, the second touch electrodes 17, and the second connection wires 19, the peripheral wires 15 also become less noticeable. By virtue of the peripheral wires 15 being made of the material identical to that of the second connection wires 19, the peripheral wires 15 can be formed in the process of forming the second connection wires 19 on the CF substrate 11a, which is suitable in reducing the production costs.

As shown in FIGS. 6 and 7, the touch electrodes 14 and the connection wires 18, 19 are provided at the surface of the CF substrate 11a on the display surface 11DS side. Accordingly, they are substantially entirely covered with the front one of the polarizers 11c attached onto the CF substrate 11a. This polarizer 11c prevents the touch electrodes 14 and the connection wires 18, 19 from being exposed to the outside, achieving protection of the touch electrodes 14 and the connection wires 18, 19.

The foregoing is the configuration of the liquid crystal display device 10 according to the present embodiment. Next, a description will be given of a method of producing the liquid crystal panel 11 forming the liquid crystal display device 10. The liquid crystal panel 11 is produced at least through: an array substrate producing step of producing the array substrate 11b; a CF substrate producing step of producing the CF substrate 11a; a joining step of joining the array substrate 11b and the CF substrate 11a to each other; and a polarizer bonding step of bonding a pair of polarizers 11c respectively to the front and back surfaces of the array substrate 11b and the CF substrate 11a. In the present embodiment, a description of the array substrate producing step, the joining step, and the polarizer bonding step is omitted, and a detailed description will be given of the CF substrate producing step.

The CF substrate producing step is described in the following. The CF substrate producing step at least includes a display function part forming step of forming a structure for realizing the display function such as a color filter or a light shielding part on the inner surface (the side opposite to the display surface 11DS side) of the glass substrate 24 forming the substrate 11aS of the CF substrate 11a, and a touchscreen function part forming step (a position input function part forming step) of forming a structure for realizing the touchscreen function on the outer surface (the display surface 11DS side) of the glass substrate 24 forming the substrate 11aS. The display function part forming step is performing using known photolithography technique or the like. Details thereof are not given herein.

The touchscreen function part forming step is described in the following. The touchscreen function part forming step at least includes: an imprint layer forming step of forming the imprint layer 25 on the outer surface of the glass substrate 24 forming the substrate 11aS of the CF substrate 11a; a groove part forming step (imprinting step) of forming the wire forming groove parts 26 at the surface of the imprint layer 25; an inner-layer-side wire forming step of forming the inner-layer-side wire forming part 22 to be the wire 21 inside each of the wire forming groove parts 26; an inner-layer-side drying step of drying the material of the inner-layer-side wire forming part 22; an outer-layer-side wire forming step of forming the outer-layer-side wire forming part 23 to be the wire 21 in each of the wire forming groove parts 26; an outer-layer-side drying step of drying the material of the outer-layer-side wire forming part 23; an insulating film forming step of forming the insulating film 20 at a portion overlapping with the first connection wire 18 formed by the wire 21; and a second connection wire forming step of forming the second connection wire 19 at a portion overlapping with the insulating film 20. FIGS. 8 to 16 which are referred to in the description of the touchscreen function part forming step do not show the structures provided at the inner surface of the glass substrate 24 of the CF substrate 11a and the array substrate 11b.

Figure 8:
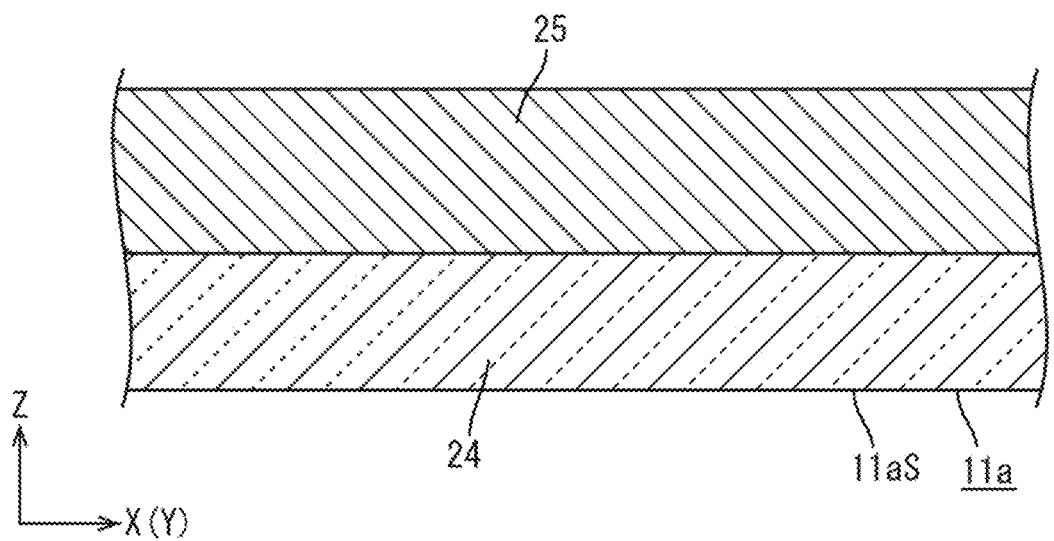
FIG. 8 is a cross-sectional view showing the state where an imprint layer is formed at a glass substrate in an imprint layer forming step.
Figure 9:
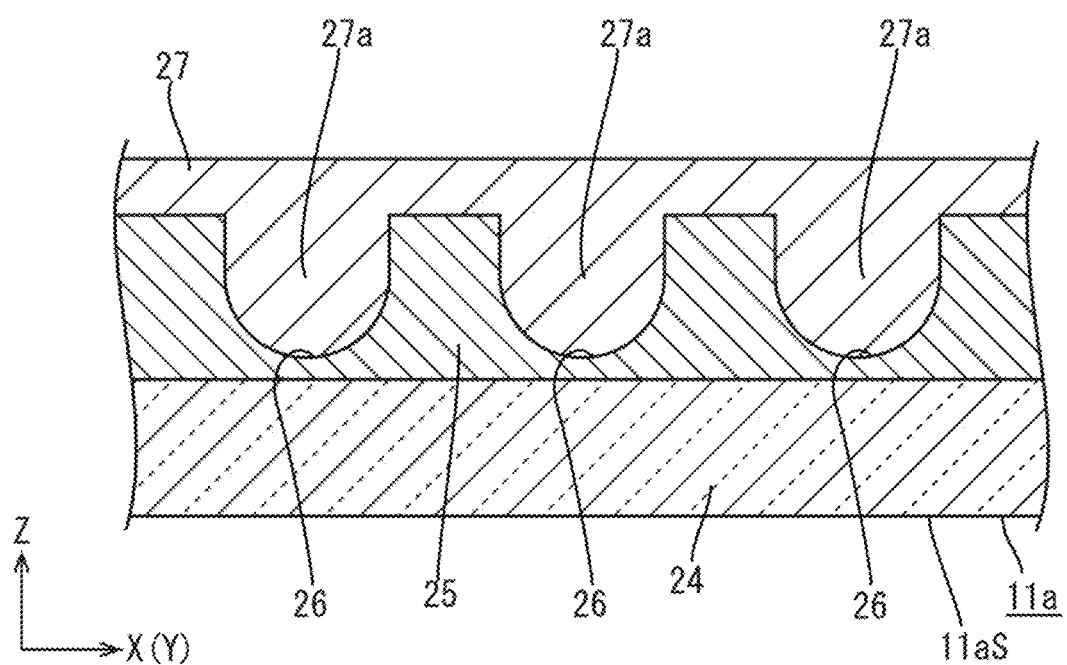
FIG. 9 is a cross-sectional view showing the state where an imprinting plate is pressed against the imprint layer in the groove part forming step.
Figure 10:
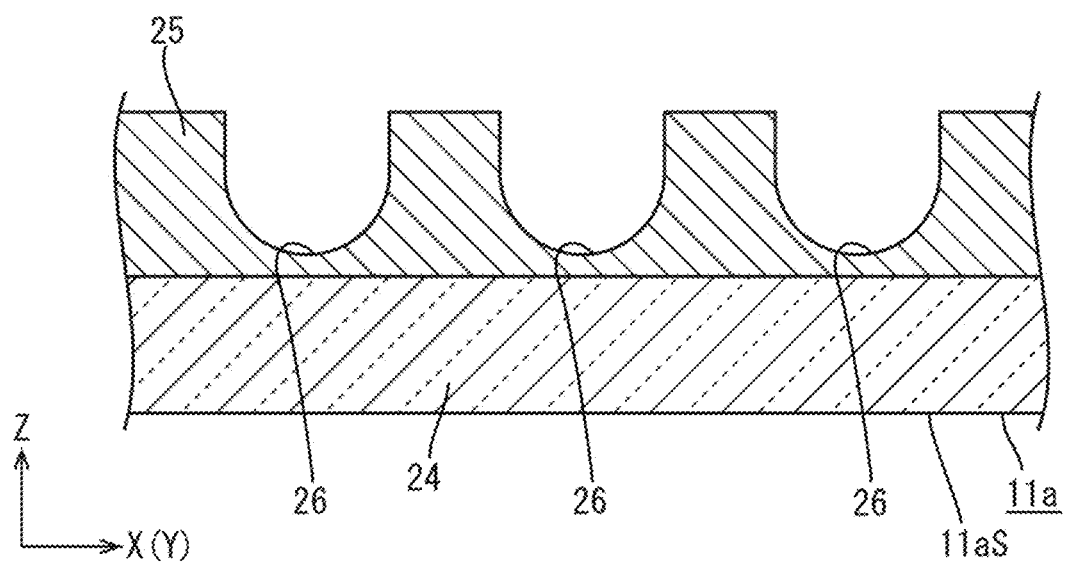
FIG. 10 is a cross-sectional view showing the state where the imprinting plate is removed from the imprint layer in the groove part forming step.

As shown in FIG. 8, first, in the imprint layer forming step, the imprint layer 25 made of an ultraviolet-cure resin material is formed on the outer surface of the glass substrate 24. Here, using an application device such as a roll coater, a spin coater (a spinner) or the like, the ultraviolet-cure resin material to be the imprint layer 25 is applied onto the surface of the glass substrate 24 by a constant thickness. In this stage, the ultraviolet-cure resin material to be the imprint layer 25 is in the uncured state. Next, as shown in FIG. 9, in the groove part forming step, an imprinting plate (a pattern mask, a transfer plate) 27 is pressed against the surface of the imprint layer 25 in the uncured state. The imprinting plate 27 has, at its abutting surface (molding surface) relative to the imprint layer 25, micro projections 27a where the shape of the wire forming groove parts 26 are transferred. Accordingly, the imprint layer 25 pressed with the imprinting plate 27 has its portions corresponding to the projections 27a recessed. In this state, irradiating the imprint layer 25 with ultraviolet rays cures the ultraviolet-cure resin material of the imprint layer 25. Thereafter, when the imprinting plate 27 is removed from the imprint layer 25, as shown in FIG. 10, those portions in the imprint layer 25 where the projections 27a of the imprinting plate 27 dig into become the wire forming groove parts 26. That is, the pattern on the imprinting plate 27 is transferred to the imprint layer 25 to form the wire forming groove parts 26. Thus, the substrate 11aS made up of the glass substrate 24 and the imprint layer 25 is obtained.

Figure 11:
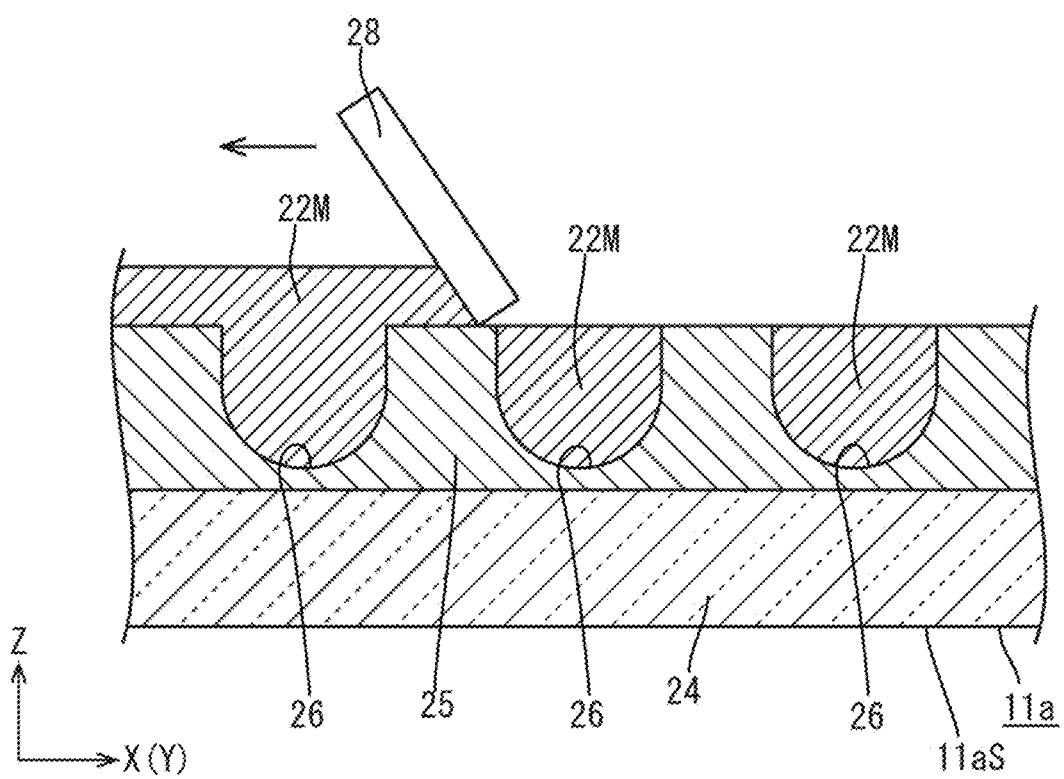
FIG. 11 is a cross-sectional view showing the process of filling a wire forming groove part with the material of an inner-layer-side wire forming part in an inner-layer-side wire forming step.

As shown in FIG. 11, in the inner-layer-side wire forming step, a material 22M of the inner-layer-side wire forming part 22 is applied onto the surface of the imprint layer 25 provided with the wire forming groove parts 26. The material 22M of the inner-layer-side wire forming part 22 is metal ink in which nanoparticles of a metal material such as silver is dissolved thereby dispersed in a solvent (a solvent agent) such as water or alcohol, and thus exhibits excellent flowability. The material 22M of the inner-layer-side wire forming part 22 applied onto the surface of the imprint layer 25 may fill up the wire forming groove parts 26 or disposed outside the wire forming groove parts 26 (on the outer surface of the substrate 11aS, on the outer surface of the imprint layer 25). Thereafter, when a squeegee 28 is slid along the surface of the imprint layer 25, the material 22M of the inner-layer-side wire forming part 22 outside the wire forming groove parts 26 on the surface of the imprint layer 25 is removed by the squeegee 28, while the material 22M of the inner-layer-side wire forming part 22 in each wire forming groove part 26 remains without being removed by the squeegee 28. When there exists any wire forming groove part 26 whose inner space has not been filled with the material 22M of the inner-layer-side wire forming part 22, this wire forming groove part 26 is filled with the material 22M of the inner-layer-side wire forming part 22 gathered by the squeegee 28 from the outside of the wire forming groove part 26. Thus, all the wire forming groove parts 26 are filled with the material 22M of the inner-layer-side wire forming part 22.

Figure 12:
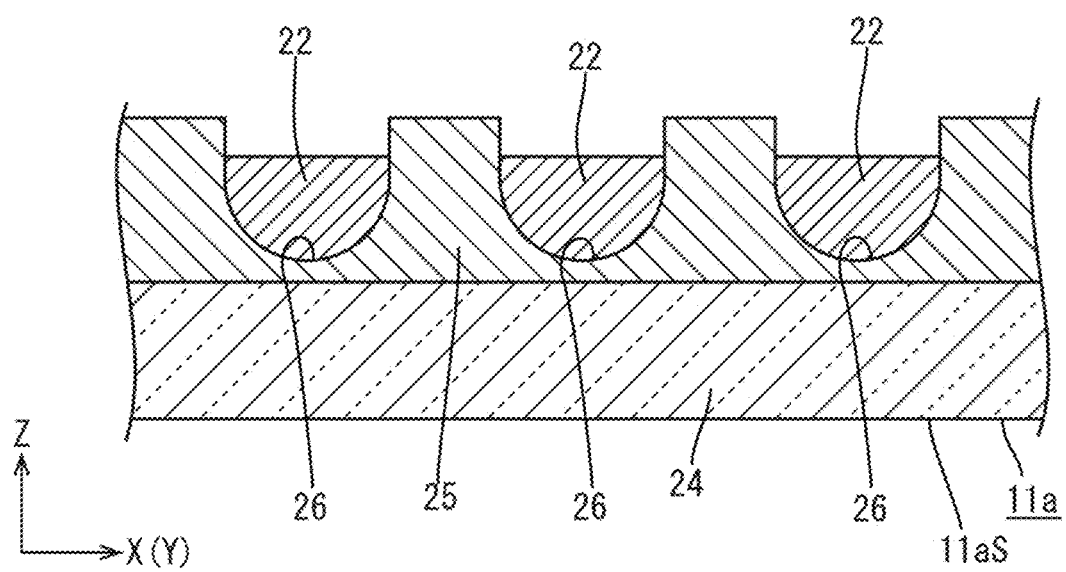
FIG. 12 is a cross-sectional view showing the state where a solvent contained in the material of the inner-layer-side wire forming part is evaporated in an inner-layer-side drying step.

In the inner-layer-side drying step, the CF substrate 11a (including the array substrate 11b) having the wire forming groove parts 26 filled with the material 22M of the inner-layer-side wire forming part 22 is dried using a dryer device which is not shown, to evaporate the solvent contained in the material 22M of the inner-layer-side wire forming part 22. Here, the drying temperature is set to fall within a range of about 100° C. to 120° C. inclusive for example, which is lower than the processing temperature in a photolithography process and a deposition process carried out in the array substrate producing step and the CF substrate producing step. This temperature range avoids any disadvantageous effect on the structures provided at the inner surface of the glass substrate 24 (such as the color filters and the light shielding parts) and the structures on the array substrate 11b side (such as the TFTs and the pixel electrodes). As shown in FIG. 12, when the solvent contained in the material 22M of the inner-layer-side wire forming part 22 is evaporated, the volume of the material 22M of the inner-layer-side wire forming part 22 in each wire forming groove part 26 is reduced by the amount of the evaporated solvent. Therefore, a space is formed in each wire forming groove part 26. That is, the inner-layer-side wire forming part 22 is formed with its outer surface recessed toward the wire forming groove part 26 from the outer surface of the substrate 11aS.

Figure 13:
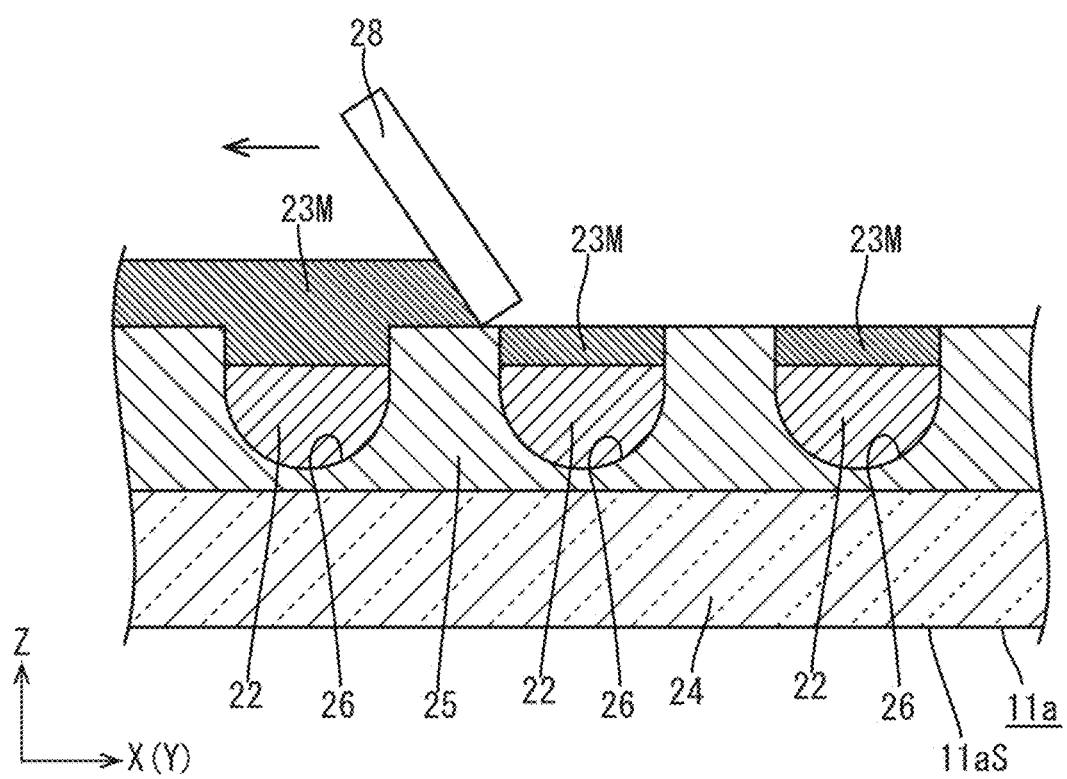
FIG. 13 is a cross-sectional view showing the process of filling the wire forming groove part with the material of an outer-layer-side wire forming part in an outer-layer-side wire forming step.

As shown in FIG. 13, in the outer-layer-side wire forming step, a material 23M of the outer-layer-side wire forming part 23 is applied onto the surface of the imprint layer 25. The material 23M of the outer-layer-side wire forming part 23 is carbon-based ink in which nanoparticles of a carbon-based conductive material such as a carbon nanotube is dispersed in a solvent (a solvent agent) such as water or alcohol, and thus exhibits excellent flowability. Here, the wire forming groove parts 26 at the surface of the imprint layer 25 each include a space which is not filled with the inner-layer-side wire forming part 22. Therefore, the material 23M of the outer-layer-side wire forming part 23 applied onto the surface of the imprint layer 25 fills up the space in each wire forming groove part 26 in a self-aligning manner. Thus, the inner-layer-side wire forming part 22 previously formed in each wire forming groove part 26 is covered easily and surely from the outside with the material 23M of the outer-layer-side wire forming part 23. Part of the material 23M of the outer-layer-side wire forming part 23 is disposed outside the wire forming groove parts 26 (on the outer surface of the substrate 11aS, on the outer surface of the imprint layer 25). Thereafter, when the squeegee 28 is slid along the surface of the imprint layer 25, the material 23M of the outer-layer-side wire forming part 23 outside the wire forming groove parts 26 on the surface of the imprint layer 25 is removed by the squeegee 28, while the material 23M of the outer-layer-side wire forming part 23 filling up the space in each wire forming groove part 26 remains without being removed by the squeegee 28. When there exists any wire forming groove part 26 whose space has not been filled with the material 23M of the outer-layer-side wire forming part 23, this wire forming groove part 26 is filled with the material 23M of the outer-layer-side wire forming part 23 gathered by the squeegee 28 from the outside of the wire forming groove part 26. Thus, all the wire forming groove parts 26 are filled with the material 23M of the outer-layer-side wire forming part 23.

Figure 14:
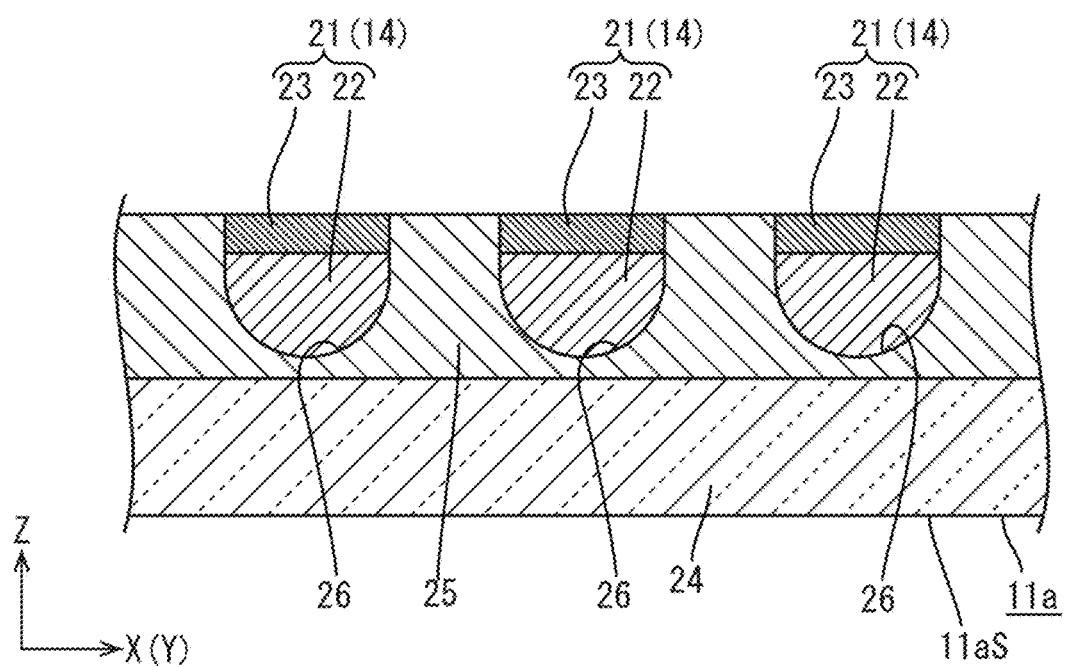
FIG. 14 is a cross-sectional view showing the state where a solvent contained in the material of the outer-layer-side wire forming part is evaporated in an outer-layer-side drying step.

In the outer-layer-side drying step, the CF substrate 11a (including the array substrate 11b) having the space in each wire forming groove part 26 filled with the material 23M of the outer-layer-side wire forming part 23 is dried using a dryer device which is not shown, to evaporate the solvent contained in the material 23M of the outer-layer-side wire forming part 23. Here, the drying temperature is set to fall within a range of about 80° C. to 100° C. inclusive for example, which is lower than the processing temperature in the photolithography process and the deposition process carried out in the array substrate producing step and the CF substrate producing step. This temperature range avoids any disadvantageous effect on the structures provided at the inner surface of the glass substrate 24 and the structures on the array substrate 11b side. As shown in FIG. 14, when the solvent contained in the material 23M of the outer-layer-side wire forming part 23 is evaporated, the outer-layer-side wire forming part 23 overlaid on the outer layer side of the inner-layer-side wire forming part 22 in each wire forming groove part 26 is formed. In this manner, the wires 21 each made up of the inner-layer-side wire forming part 22 and the outer-layer-side wire forming part 23 are formed and, consequently, the first touch electrodes 16, the second touch electrodes 17, and the first connection wires 18 are formed on the display surface 11DS side of the CF substrate 11a. Thus, with the wire forming groove parts 26 formed at the imprint layer 25 using the imprinting technique, the fine wires 21 are arranged at proper locations in the surface of the CF substrate 11a. The outer surface of the outer-layer-side wire forming part 23 is substantially flush with the outer surface of the substrate 11aS. Note that, while the volume of the material 23M of the outer-layer-side wire forming part 23 is reduced by the amount of the evaporated solvent, the original amount of the material 23M of the outer-layer-side wire forming part 23 introduced into the wire forming groove part 26 is considerably smaller than that of the material 22M of the inner-layer-side wire forming part 22. Therefore, the difference between the outer surface of the outer-layer-side wire forming part 23 and the outer surface of the substrate 11aS (the outer surface of the imprint layer 25) that arises attributed to the evaporation of the solvent is very small.

Figure 15:
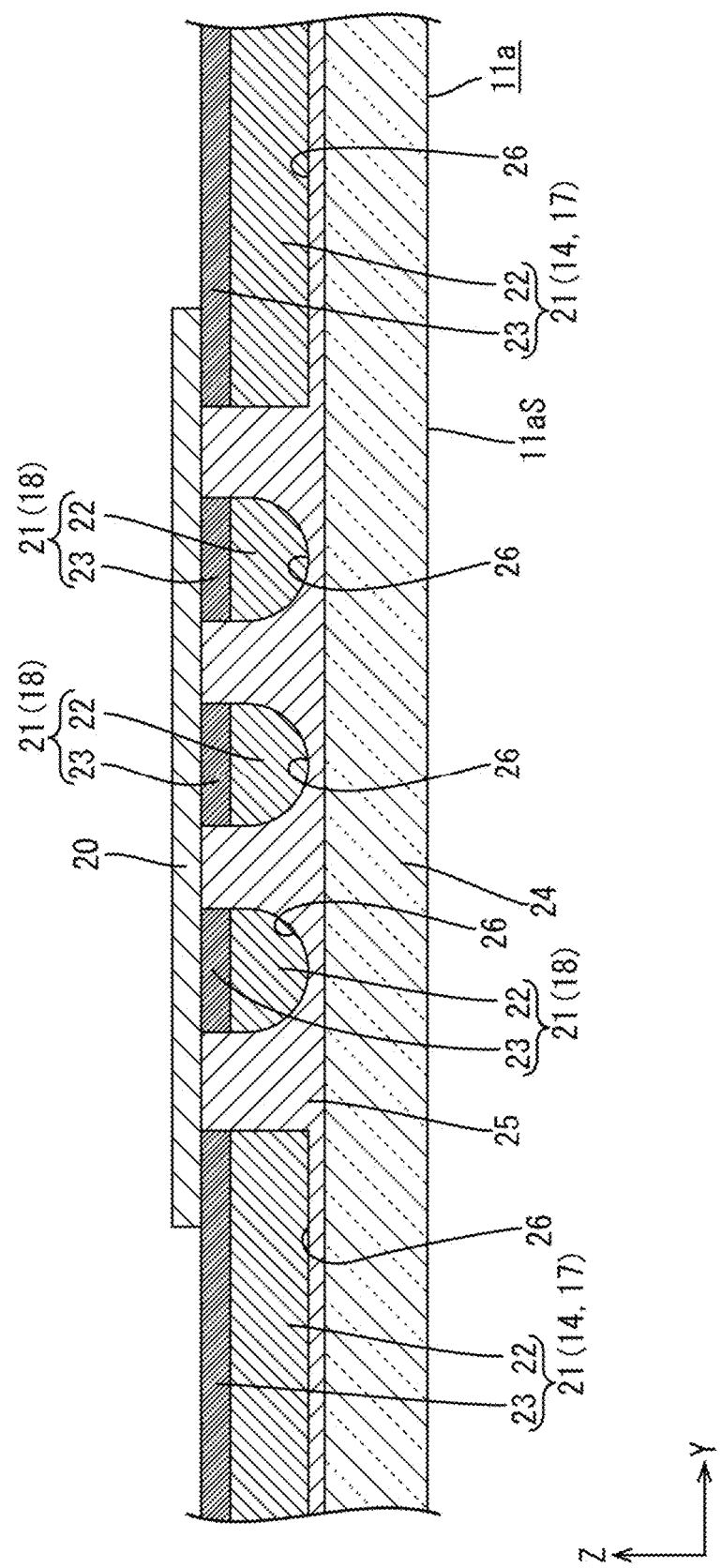
FIG. 15 is a cross-sectional view showing the state where an insulating film is formed in an insulating film forming step.

As shown in FIG. 15, in the insulating film forming step, the material of the insulating film 20 is applied in a band-like range including an overlapping portion between the first connection wire 18 and the second connection wire 19 formed later, in the outer surface of the substrate 11aS. The material of the insulating film 20 may be, for example, a synthetic resin material which is highly insulating, such as polyimide. The insulating film 20 is formed island-like in the outer surface of the substrate 11aS, and a multitude of the insulating films 20 are dispersedly disposed at a certain interval. Accordingly, in applying the material of the insulating film 20, for example, an inkjet device is preferably used. In applying the material of the insulating film 20 using the inkjet device, the temperature of the CF substrate 11a (the array substrate 11b) is preferably heated to about 70° C., for example.

Figure 16:
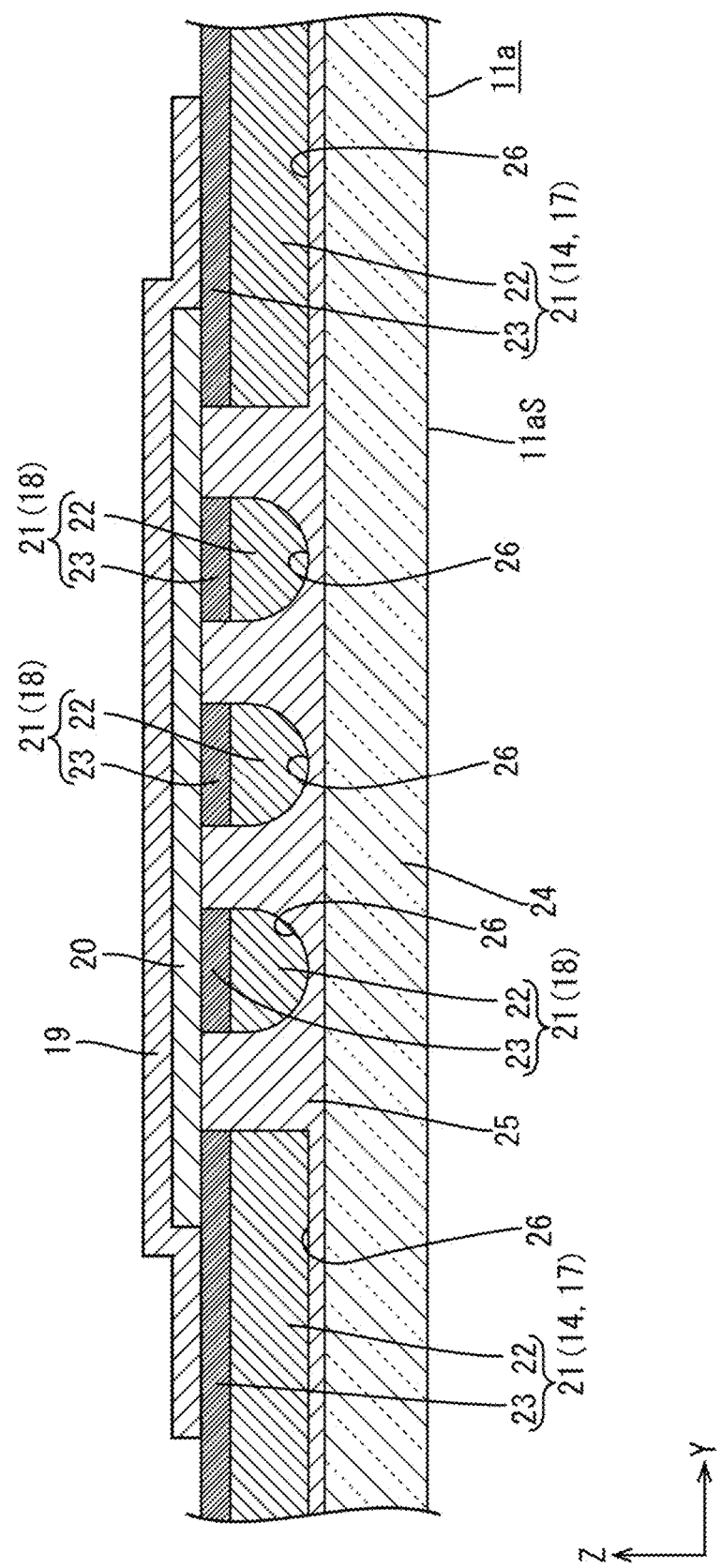
FIG. 16 is a cross-sectional view showing the state where the second connection wire is formed in a second connection wire forming step.

As shown in FIG. 16, in the second connection wire forming step, the material of the second connection wires 19 is applied in a band-like range including part of the formation range of the second touch electrodes 17 and part of the formation range of the insulating film 20 in the outer surface of the substrate 11aS. The material of the second connection wires 19 is carbon-based ink in which nanoparticles of a carbon-based conductive material such as a carbon nanotube is dissolved thereby dispersed in a solvent (a solvent agent) such as water or alcohol. That is, the material of the second connection wires 19 is identical to the material 23M of the outer-layer-side wire forming part 23. Accordingly, the second connection wires 19 each establish an ohmic contact in an excellent manner with the outer-layer-side wire forming part 23 of each wire 21 forming the second touch electrodes 17. This minimizes the connection resistance between the second connection wires 19 and the second touch electrodes 17. The second connection wires 19 are each formed island-like in the outer surface of the substrate 11aS and are dispersedly disposed at a certain interval. Accordingly, in applying the material of the second connection wires 19, for example, an inkjet device is preferably used. In applying the material of the second connection wires 19 using the inkjet device, the temperature of the CF substrate 11a (the array substrate 11b) is preferably heated to about 70° C., for example. After the applying the material of the second connection wires 19, through a drying step similar to the outer-layer-side drying step, the material of the second connection wires 19 is cured and fixed.

As has been described above, the CF substrate (the wiring board) 11a according to the present embodiment includes: the substrate 11aS; the wires 21 formed at the surface of the substrate 11aS; the inner-layer-side wire forming part 22 forming the wires 21 and made of a conductive material; and the outer-layer-side wire forming part 23 forming the wires 21, disposed on the outer layer side relative to the inner-layer-side wire forming part 22, and made of a conductive material which is different from the material of the inner-layer-side wire forming part 22 and higher in light absorptance than the material of the inner-layer-side wire forming part 22.

In this manner, the outer-layer-side wire forming part 23 forming the wires 21 and disposed on the outer layer side relative to the inner-layer-side wire forming part 22 is made of a conductive material higher in light absorptance than the inner-layer-side wire forming part 22. Therefore, as compared to a case where the wires are each formed of just the inner-layer-side wire forming part 22, the outer-layer-side wire forming part 23 absorbs a greater amount of extraneous light becoming incident on the surface of the substrate 11aS. This reduces reflective light at the outer-layer-side wire forming part 23 or reflective light attributed to light transmitting through the outer-layer-side wire forming part 23 and light reflected at the inner-layer-side wire forming part 22. That is, by virtue of the reduced reflective light at the wires 21, the wires 21 become less noticeable.

While the outer-layer-side wire forming part 23 is fully high in light absorptance, the outer-layer-side wire forming part 23 may not be fully high in conductivity, for example, and may incur increased material costs. In this regard, the inner-layer-side wire forming part 22 is made of a conductive material different from the material of the outer-layer-side wire forming part 23. This eliminates the necessity of taking into consideration of the light absorbing performance in selecting the material of the inner-layer-side wire forming part 22. Accordingly, the material of the inner-layer-side wire forming part 22 can be freely selected, such as a highly conductive material or a cost-effective material. Thus, as compared to a case where the wires are formed of just the outer-layer-side wire forming part 23, the present embodiment is suitable in improving the conductivity of the wires 21 or reducing the production costs.

The substrate 11aS has a layered structure made up of the glass substrate (base member) 24 and the imprint layer 25 disposed on the outer layer side relative to the glass substrate 24. The imprint layer 25 is provided with the wire forming groove parts 26 by which the surface of the imprint layer 25 is partially recessed to form the wires 21. In this manner, the wires 21 are formed in the wire forming groove parts 26 which are formed having the surface of the imprint layer 25 provided on the outer layer side of the glass substrate 24 partially recessed. Accordingly, for example, using the imprinting technique, the fine wires 21 are disposed at proper locations in the surface of the substrate 11aS.

The outer-layer-side wire forming part 23 at least contains a carbon-based conductive material. This improves the conductivity and the light absorbing performance of the outer-layer-side wire forming part 23.

The inner-layer-side wire forming part 22 contains at least a metal material. This improves the conductivity of the inner-layer-side wire forming part 22 and minimizes the material costs.

The CF substrate (position input device) 11a according to the present embodiment includes the configuration included in the CF substrate 11a, and the touch electrodes (position detecting electrodes) 14 which form a capacitance between a finger (a position input element) performing a position input in the surface of the substrate 11aS and detect the input position of the finger. The wires 21 form at least the touch electrodes 14. With the CF substrate 11a, when a position input is performed in the surface of the substrate 11aS with a finger, a touch electrode 14 which forms a capacitance between the touch electrode 14 and the finger detects the input position of the finger. Since the touch electrodes 14 are formed of the wires 21 each made up of the inner-layer-side wire forming part 22 and the outer-layer-side wire forming part 23, the touch electrodes 14 are less likely to reflect extraneous light and therefore become less likely to be visually recognized. This improves the appearance of the CF substrate 11a.

The touch electrodes 14 include the first touch electrodes (first position detecting electrodes) 16 arranged in the first direction extending along the surface of the substrate 11aS, and the second touch electrodes (second position detecting electrodes) 17 arranged in the second direction extending along the surface of the substrate 11aS and crossing the first direction. The substrate 11aS is provided with the first connection wires 18 each connecting between adjacent ones of the first touch electrodes 16 in the first direction, and the second connection wires 19 each connecting between adjacent ones of the second touch electrodes 17 in the second direction and disposed on the outer layer side relative to the first connection wires 18 via the insulating film 20. The second connection wires 19 are made of a conductive material higher in light absorptance than the material of the inner-layer-side wire forming part 22. In this manner, the first touch electrodes 16 arranged in the first direction are connected to one another by the first connection wires 18, whereas the second touch electrodes 17 arranged in the second direction are connected to one another by the second connection wires 19. The second connection wires 19 disposed on the outer layer side relative to the first connection wires 18 via the insulating film 20 is made of a conductive material being higher in light absorptance than the material of the inner-layer-side wire forming part 22. Therefore, as compared to a case where the second connection wires are made of a material identical to the material of the inner-layer-side wire forming part 22, the second connection wires 19 absorb a greater amount of extraneous light becoming incident on the surface of the substrate 11aS. This reduces reflective light at the second connection wires 19 and, accordingly, the second connection wires 19 become less noticeable.

The second connection wires 19 are made of a material identical to the material of the outer-layer-side wire forming part 23. Since the second touch electrodes 17 which are the connection target of the second connection wires 19 are formed of the wires 21 each made up of the outer-layer-side wire forming part 23 and the inner-layer-side wire forming part 22, the second connection wires 19 establishes a contact with the outer-layer-side wire forming part 23 in each second touch electrode 17. By virtue of the second connection wires 19 being made of a material identical to the material of the outer-layer-side wire forming part 23, an excellent contact state is established between them and, consequently, the contact resistance is minimized.

The present embodiment further includes the peripheral wires 15 disposed outside the region where the touch electrodes 14 are arranged in the surface of the substrate 11aS, and connected to the touch electrodes 14. The peripheral wires 15 are made of a material identical to the material of the second connection wires 19. This configuration allows the second connection wires 19 and the peripheral wires 15 to be formed in an identical step, which is suitable in reducing the production costs.

The liquid crystal panel (position input function-equipped display panel) 11 according to the present embodiment includes at least: the configuration included in the CF substrate 11a; the CF substrate (first display substrate) 11a including the display surface 11DS where an image is displayed; and an array substrate (second display substrate) 11b disposed so as to oppose to one surface of the CF substrate 11a, which one surface is on the side opposite to the display surface 11DS. The CF substrate 11a is provided with the touch electrodes 14 on the display surface 11DS, which touch electrodes 14 form the substrate 11aS of the CF substrate 11a. The liquid crystal panel 11 in this configuration allows the user to perform a position input in the surface of the display surface 11DS in accordance with an image displayed on the display surface 11DS of the CF substrate 11a which is disposed so as to oppose to the array substrate 11b. By virtue of the provision of the touch electrodes 14 formed of the wires 21 each made up of the inner-layer-side wire forming part 22 and the outer-layer-side wire forming part 23 on the display surface 11DS side of the CF substrate 11a, reflection of the extraneous light at the touch electrodes 14 is minimized, whereby the touch electrodes 14 become less likely to be visually recognized. Hence, the display quality of an image displayed on the display surface 11DS improves.

The present embodiment further includes at least the polarizer 11c disposed to have the touch electrodes 14 interposed between the polarizer 11c and the CF substrate 11a. Thus, the touch electrodes 14 are covered with the polarizer 11c thereby prevented from exposure to the outside. This achieves protection of the touch electrodes 14.

A method of producing the CF substrate (wiring board) 11a according to the present embodiment includes at least: the inner-layer-side wire forming step of forming the inner-layer-side wire forming part 22 made of a conductive material on the surface of the substrate 11aS; and the outer-layer-side wire forming step of forming the outer-layer-side wire forming part 23 made of a conductive material different from and higher in light absorptance than the material of the inner-layer-side wire forming part 22 on the outer layer side relative to the inner-layer-side wire forming part 22. According to this method of producing the CF substrate 11a, the inner-layer-side wire forming part 22 made of a conductive material is formed at the surface of the substrate 11aS in the inner-layer-side wire forming step. Thereafter, the outer-layer-side wire forming part 23 made of a conductive material different from and higher in light absorptance than the material of the inner-layer-side wire forming part 22 is formed on the outer layer side relative to the inner-layer-side wire forming part 22 in the outer-layer-side wire forming step. The outer-layer-side wire forming part 23 formed through the outer-layer-side wire forming step is made of a conductive material which is higher in light absorptance than the material of the inner-layer-side wire forming part 22. Therefore, as compared to a case where just the inner-layer-side wire forming part 22 is formed at the surface of the substrate, the outer-layer-side wire forming part 23 absorbs a greater amount of extraneous light becoming incident on the surface of the substrate 11aS. This reduces reflective light at the outer-layer-side wire forming part 23 or reflective light attributed to light transmitting through the outer-layer-side wire forming part 23 and reflected at the inner-layer-side wire forming part 22. That is, reflective light at the outer-layer-side wire forming part 23 and at the inner-layer-side wire forming part 22 reduces and, therefore, the wires 21 made up of the outer-layer-side wire forming part 23 and the inner-layer-side wire forming part 22 become less noticeable. Thus, while the outer-layer-side wire forming part 23 is fully high in light absorptance, the outer-layer-side wire forming part 23 may not be fully high in conductivity, for example, and may incur increased material costs. In this regard, the inner-layer-side wire forming part 22 is made of a conductive material different from the material of the outer-layer-side wire forming part 23. This eliminates the necessity of taking into consideration of the light absorbing performance in selecting the material of the inner-layer-side wire forming part 22. Accordingly, the material of the inner-layer-side wire forming part 22 can be freely selected, such as a highly conductive material or a cost-effective material. Thus, as compared to a case where the wires are formed of just the outer-layer-side wire forming part 23, the present embodiment is suitable in improving the conductivity of the wires 21 or reducing the production costs.

The present embodiment includes at least: the imprint layer forming step of, preceding at least the inner-layer-side wire forming step, forming the imprint layer 25 on the outer layer side of the glass substrate 24 forming the substrate 11aS; and the groove part forming step of forming the wire forming groove part 26 having the surface of the imprint layer 25 partially recessed. In the inner-layer-side wire forming step and the outer-layer-side wire forming step, the inner-layer-side wire forming part 22 and outer-layer-side wire forming part 23 are formed in each of the wire forming groove parts 26. In this manner, in the imprint layer forming step, by the imprint layer 25 being formed on the outer layer side of the glass substrate 24, the substrate 11aS having a layered structure is obtained. Subsequently, in the groove part forming step, by the surface of the imprint layer 25 being partially recessed, the wire forming groove parts 26 are formed. Then, in the inner-layer-side wire forming step, after the inner-layer-side wire forming part 22 is formed in each of the wire forming groove parts 26, in the outer-layer-side wire forming step, the outer-layer-side wire forming part 23 is formed in each of the wire forming groove parts 26. Thus, using the imprinting technique for example, the fine wires 21 are arranged at proper locations in the surface of the substrate 11aS.

In the inner-layer-side wire forming step, the material 22M of the inner-layer-side wire forming part 22 is a conductive material dissolved in a solvent. The present embodiment includes at least a drying step performed between the inner-layer-side wire forming step and the outer-layer-side wire forming step to evaporate the solvent contained in the material 22M of the inner-layer-side wire forming part 22. In this manner, in the inner-layer-side wire forming step, the material 22M in which a conductive material is dissolved in a solvent is used and the inner-layer-side wire forming part 22 is formed. Thereafter, in the drying step, when the solvent contained in the material 22M of the inner-layer-side wire forming part 22 is evaporated, the volume of the material 22M of the inner-layer-side wire forming part 22 in each wire forming groove part 26 is reduced. Therefore, a space is formed in each wire forming groove part 26. Accordingly, in the subsequent outer-layer-side wire forming step, using the space formed in the wire forming groove part 26, the outer-layer-side wire forming part 23 is formed in a self-aligning manner. Thus, the outer-layer-side wire forming part 23 is disposed easily and surely on the outer layer side relative to the inner-layer-side wire forming part 22.

Second Embodiment

With reference to FIGS. 17 to 21, a description will be given of a second embodiment of the present invention. In the second embodiment, a touchscreen 29 is provided separately from a liquid crystal panel 111. The configuration, operation and effect similar to those in the first embodiment will not be repetitively described.

Figure 17:
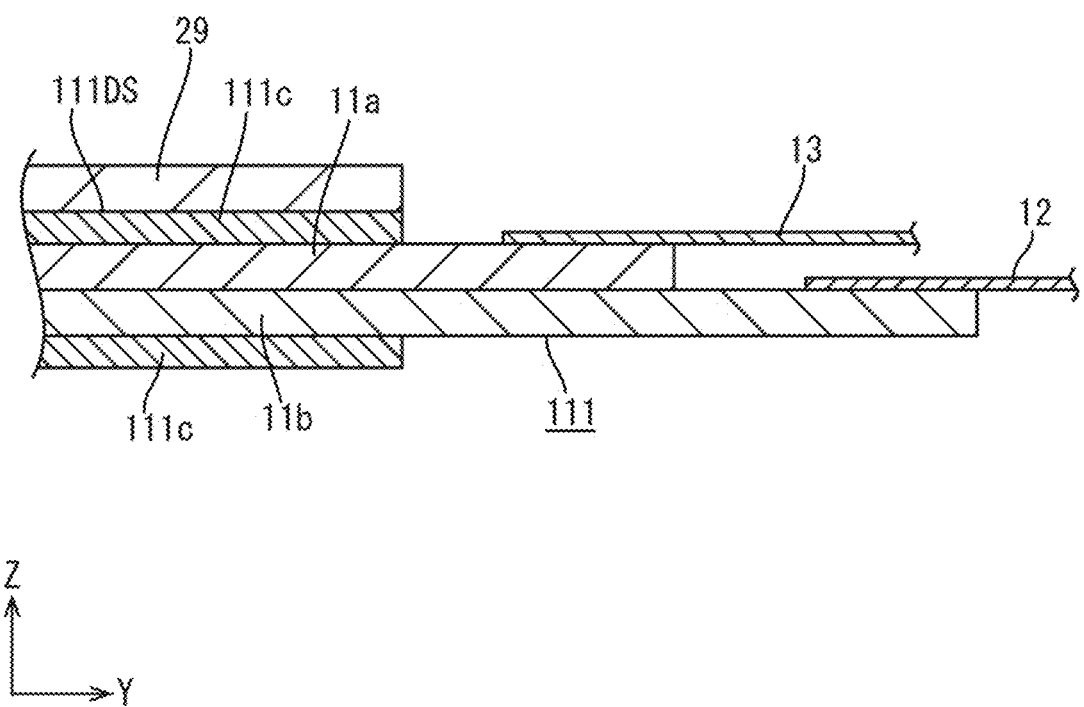
FIG. 17 is a cross-sectional view of a touchscreen and a liquid crystal panel according to a second embodiment of the present invention.

As shown in FIG. 17, to the liquid crystal panel 111 according to the present embodiment, a touchscreen (wiring board, position input device) 29 as a separate component is disposed to be overlaid on the front side (the display surface 111DS side) of the front one of the polarizers 111c. That is, the touchscreen 29 according to the present embodiment is a so-called out-cell type. The touchscreen 29 is provided with a touchscreen pattern of the mutual capacitive scheme which is substantially similar to the first embodiment. In the following, as to the configuration of the touchscreen pattern, a description will be mainly given of the difference from the first embodiment and not of those similar to the first embodiment.

Figure 18:
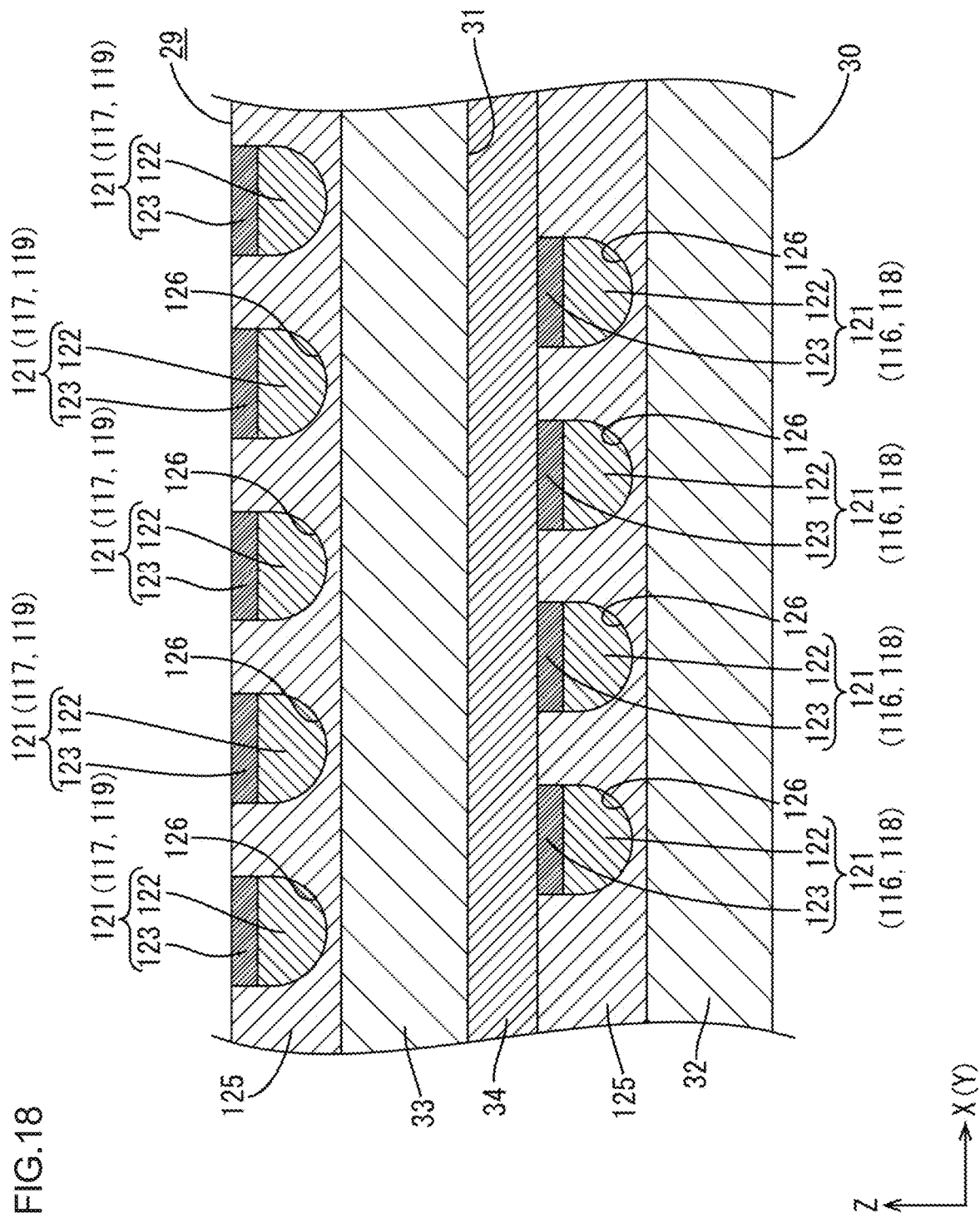
FIG. 18 is a cross-sectional view of a first substrate, a second substrate, and a fixing layer forming the touchscreen.

As shown in FIG. 18, the touchscreen 29 includes a first substrate 30 and a second substrate 31 layered on each other respectively on the front side and the back side. The first substrate 30 and the second substrate 31 respectively include base members 32, 33 each film-like and made of a substantially transparent synthetic resin material, and are highly light transmissive and flexible. The first substrate 30 and the second substrate 31 are each provided with an imprint layer 125 on the outer layer side of their respective base members 32, 33. The imprint layer 125 is provided with wire forming groove parts 126. The forming the imprint layer 125 and the wire forming groove parts 126 at each of the base members 32, 33 should be carried out similarly to the imprint layer forming step and the groove part forming step according to the first embodiment.

Figure 19:
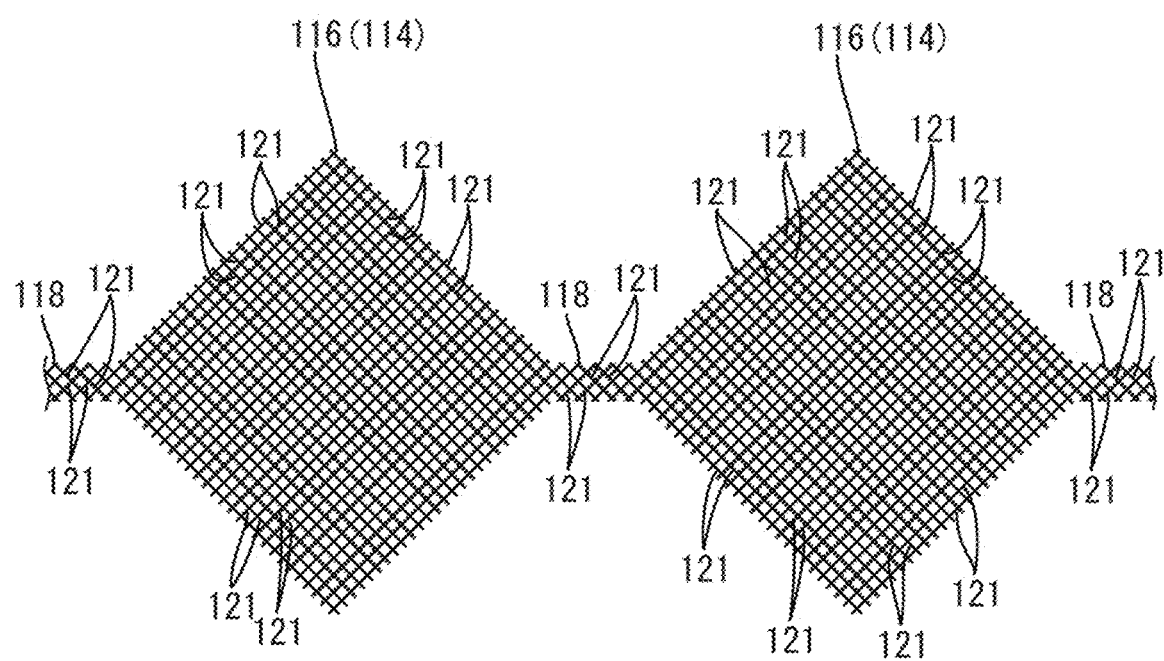
FIG. 19 is an enlarged plan view of first touch electrodes and first connection wires in the first substrate.
Figure 20:
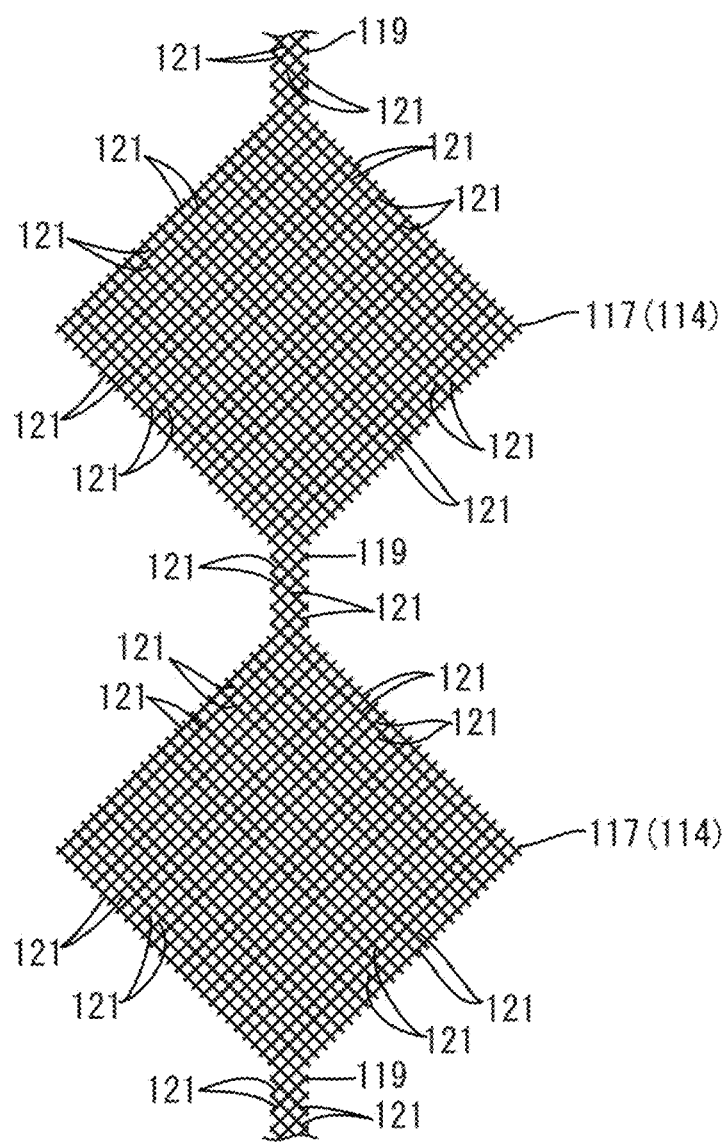
FIG. 20 is an enlarged plan view of second touch electrodes and second connection wires in the second substrate.

As shown in FIGS. 18 and 19, the first substrate 30 is provided with first touch electrodes 116 and first connection wires 118. The first touch electrodes 116 and the first connection wires 118 are formed of wires 121 each made up of an inner-layer-side wire forming part 122 and an outer-layer-side wire forming part 123 being layered on each other, and disposed in the wire forming groove parts 126 of the imprint layer 125. Accordingly, extraneous light becoming incident on the surface of the first substrate 30 is fully absorbed by the outer-layer-side wire forming part 123 of each of the wires 121 forming the first touch electrodes 116 and the first connection wires 118. As shown in FIGS. 18 and 20, the second substrate 31 is provided with second touch electrodes 117 and second connection wires 119. The second touch electrodes 117 and the second connection wires 119 are formed of wires 121 each made up of an inner-layer-side wire forming part 122 and an outer-layer-side wire forming part 123 being layered on each other, and disposed in wire forming groove parts 126 of the imprint layer 125. Accordingly, extraneous light becoming incident on the surface of the second substrate 31 is fully absorbed by the outer-layer-side wire forming part 123 of each of the wires 121 forming the second touch electrodes 117 and the second connection wires 119. Thus, by virtue of the reduced reflective light at the first touch electrodes 116, the first connection wires 118, the second touch electrodes 117, and the second connection wires 119, the first touch electrodes 116, the first connection wires 118, the second touch electrodes 117, and the second connection wires 119 become less noticeable. As shown in FIGS. 19 and 20, the wires 121 and the wire forming groove parts 126 according to the present embodiment include those extending in a first diagonal direction relative to the X-axis direction and the Y-axis direction, and those extending in a second diagonal direction perpendicular to the first diagonal direction. The forming the wires 121 forming the touch electrodes 116, 117 and the connection wires 118, 119 in the wire forming groove parts 126 of the imprint layer 125 should be carried out similarly to the inner-layer-side wire forming step, the inner-layer-side drying step, the outer-layer-side wire forming step, and the outer-layer-side drying step according to the first embodiment.

As shown in FIG. 18, the second substrate 31 is fixed to the first substrate 30 having its surface provided with the second touch electrodes 117 and the second connection wires 119 opposed to one surface of the first substrate 30, which one surface is opposite to the surface provided with the first touch electrodes 116 and the first connection wires 118. Between the first substrate 30 and the second substrate 31, a fixing layer 34 formed of an OCA (Optical Clear Adhesive) film or the like is interposed. In the state where the first substrate 30 and the second substrate 31 are fixed by the fixing layer 34, at least the first connection wires 118 and the second connection wires 119 are arranged to cross each other and overlap with each other. While the first connection wires 118 and the second connection wires 119 are formed of the wires 121, by virtue of the second substrate 31 and the fixing layer 34 being interposed in the Z-axis direction between the first connection wires 118 and the second connection wires 119, short-circuiting is avoided and insulation is realized without the use of the insulating film 20 according to the first embodiment. This configuration advantageously allows, for example, the ends of the first touch electrodes 116 and the second touch electrodes 117 to be overlapped with each other as seen in a plan view as shown in FIG. 21. The second substrate 31 and the fixing layer 34 being interposed between the first touch electrodes 116 and the second touch electrodes 117 overlapping with each other avoid short-circuiting and the first touch electrodes 116 and the second touch electrodes 117 are insulated from each other. In this manner, the wires 121 are allowed to be arranged over substantially the entire surface of the touchscreen 29. Accordingly, as compared to a case where the wires 121 are not formed partially in the surface of the touchscreen 29, light transmittance of the touchscreen 29 is equalized. The method of producing the touchscreen 29 according to the present embodiment dispenses with the insulating film forming step and the second connection wire forming step according to the first embodiment which both use an inkjet device and, therefore, the present embodiment is suitable in reducing the production costs. Note that, when the wires 121 shown in FIG. 18 represent the first touch electrodes 116 and the second touch electrodes 117, FIG. 18 corresponds to a cross-sectional view of a portion where the first touch electrodes 116 and the second touch electrodes 117 overlap with each other.

As has been described above, according to the present embodiment, the touch electrodes 114 include the first touch electrodes 116 arranged in the first direction extending along the surface of the first substrate (substrate) 30, and the second touch electrodes 117 arranged in the second direction extending along the surface of the second substrate (substrate) 31 and perpendicular to the first direction. The first substrate 30 and the second substrate 31 are provided with the first connection wires 118 each connecting between adjacent ones of the first touch electrodes 116 in the first direction and formed of the wires 121 identical to the first touch electrodes 116, and the second connection wires 119 each connecting between adjacent ones of the second touch electrodes 117 in the second direction and formed of the wires 121 identical to the second touch electrodes 117. The first substrate 30 and the second substrate 31 are formed of the first substrate 30 provided with at least the first touch electrodes 116 and the first connection wires 118, and the second substrate 31 provided with at least the second touch electrodes 117 and the second connection wires 119 and fixed to the first substrate 30 having its surface provided with the second touch electrodes 117 and the second connection wires 119 opposed to one surface of the first substrate 30, which one surface is opposite to the surface provided with the first touch electrodes 116 and the first connection wires 118.

In this manner, the first touch electrodes 116 arranged in the first direction are connected to one another with the first connection wires 118, and the second touch electrodes 117 arranged in the second direction are connected to one another with the second connection wires 119. The first touch electrodes 116 and the first connection wires 118 are both provided at the first substrate 30 and formed of identical wires 121. Similarly, the second touch electrodes 117 and the second connection wires 119 are both provided at the second substrate 31 and formed of identical wires 121. Accordingly, extraneous light becoming incident on the surface of the first substrate 30 is fully absorbed by the outer-layer-side wire forming part 123 at each of the first touch electrodes 116 and the first connection wires 118. Similarly, extraneous light becoming incident on the surface of the second substrate 31 is fully absorbed by the outer-layer-side wire forming part 123 at each of the second touch electrodes 117 and the second connection wires 119. This reduces reflective light at the first touch electrodes 116, the first connection wires 118, the second touch electrodes 117, and the second connection wires 119. Therefore, the first touch electrodes 116, the first connection wires 118, the second touch electrodes 117, and the second connection wires 119 become less noticeable. Additionally, the second substrate 31 is fixed to the first substrate 30 having its surface provided with the second touch electrodes 117 and the second connection wires 119 opposed to one surface of the first substrate 30, which one surface is opposite to the surface provided with the first touch electrodes 116 and the first connection wires 118. This avoids short-circuiting between the first touch electrodes 116 and the first connection wires 118 and the second touch electrodes 117 and the second connection wires 119. This improves flexibility in arranging the first touch electrodes 116, the first connection wires 118, the second touch electrodes 117, and the second connection wire 119. Therefore, for example, the first touch electrodes 116 and the second touch electrodes 117 may overlap with each other, and the necessity of separately providing an insulating film for preventing short-circuiting is eliminated.

Other Embodiments

The present invention is not limited to the embodiments described above with reference to the drawings. For example, the technical scope of the present invention also covers the following embodiments.

(1) While the above-described embodiments show the case where the material of the inner-layer-side wire forming part is silver nanoparticle ink, the material of the inner-layer-side wire forming part may be gold nanoparticle ink containing gold as a metal material, copper nanoparticle ink containing copper as a metal material, or silver paste containing silver as a metal material.

(2) While the above-described embodiments show the case where the material of the outer-layer-side wire forming part is carbon nanotube ink, the material of the outer-layer-side wire forming part may be fullerene ink containing fullerene as a carbon-based conductive material, graphene ink (carbon ink) containing graphene (carbon) as a carbon-based conductive material, or hybrid type (hybrid type) ink in which a metal material (nanoparticles of silver or the like) are dispersed in a carbon-based non-conductive material or a carbon-based conductive material. Such a material may be used also as the material of the second connection wire according to the first embodiment.

(3) While the above-described embodiments show the case where the conductive material contained in the inner-layer-side wire forming part and the conductive material contained in the outer-layer-side wire forming part are different from each other, the inner-layer-side wire forming part and the outer-layer-side wire forming part may contain an identical conductive material.

(4) While the above-described embodiments show the case where the inner-layer-side wire forming part is higher in conductivity than the outer-layer-side wire forming part, the outer-layer-side wire forming part may be equivalent in conductivity to the inner-layer-side wire forming part, or the outer-layer-side wire forming part may be higher in conductivity than the inner-layer-side wire forming part. The outer-layer-side wire forming part should just be higher in light absorptance than the inner-layer-side wire forming part.

(5) While the above-described embodiments show the case where the imprint layer is made of an ultraviolet-cure resin material, the material of the imprint layer may be, for example, a thermosetting resin material or a thermoplastic resin material.

(6) While the above-described first embodiment shows the case where the peripheral wires are made of a material identical to the material of the second connection wires and formed in a step identical to forming the second connection wires, the peripheral wires may be formed of wires identical to those forming the first touch electrodes, the first connection wires, and the second touch electrodes, and may be formed in a step identical to forming the first touch electrodes, the first connection wires, and the second touch electrodes.

(7) While the above-described first embodiment shows the case where the material of the second connection wires is identical to the material of the outer-layer-side wire forming part, the material of the second connection wires may be different from the material of the outer-layer-side wire forming part.

(8) While the above-described embodiments show the case where the CF substrate and the array substrate forming the liquid crystal panel each include a glass substrate, the CF substrate and the array substrate may each include a resin base member made of synthetic resin. In this case, when the resin base member is film-like and flexible, the liquid crystal panel may be flexed. In such a case where the CF substrate includes a resin base member, the resin base member may be produced by, for example, injection molding, and the wire forming groove parts may be transferred by a mold assembly used in the molding.

(9) While the above-described second embodiment shows the case where the first substrate is disposed on the back side and the second substrate is disposed on the front side, the first substrate may be disposed on the front side and the second substrate may be disposed on the back side.

(10) While the above-described second embodiment shows the case where the first substrate and the second substrate each include a film-like base member made of synthetic resin, the first substrate and the second substrate may each include a glass substrate.

(11) In the configuration of the above-described first embodiment, the extending direction of the wires may agree with the first diagonal direction and the second diagonal direction as in the second embodiment. Similarly, in the configuration of the second embodiment, the extending direction of the wires may agree with the X-axis direction and the Y-axis direction as in the first embodiment.

(12) In addition to the configuration of the above-described embodiments, the aligning direction of the first touch electrodes and the first connection wires and the aligning direction of the second touch electrodes and the second connection wires may be interchanged with each other.

(13) While the above-described embodiments show the case where the planar shape of each touch electrode is a rhombus, the planar shape of each touch electrode may be changed as appropriate such as a quadrangle, a circle, a polygon including five or more angles.

(14) While the above-described embodiments show the touchscreen pattern of the mutual capacitive scheme, the present invention is applicable also to a touchscreen pattern of the self-capacitance type.

(15) While the above-described embodiments show the case where the planar shape of the liquid crystal display device is a vertically elongated quadrangle, the shape may be a horizontally elongated quadrangle or a square, or a non-quadrangular shape such as a circle, an oval, and a trapezoid.

(16) Without being limited to the above-described embodiments, the specific screen size of the liquid crystal panel may be changed as appropriate. For example, it may be smaller than 70 inches or greater than 100 inches.

EXPLANATION OF SYMBOLS 11, 111: Liquid crystal panel (Position input function-equipped display panel)
11a: CF substrate (Wiring board, Position input device, First display substrate)
11aS: Substrate
11b: Array substrate (Second display substrate)
11c, 111c: Polarizer
11DS, 111DS: Display surface
14: Touch electrode (Position detecting electrode)
15: Peripheral wire
16, 116: First touch electrode (Position detecting electrode)
17, 117: Second touch electrode (Position detecting electrode)
18, 118: First connection wire
19, 119: Second connection wire
20: Insulating film
21, 121: Wire
22, 122: Inner-layer-side wire forming part
22M: Material
23, 123: Outer-layer-side wire forming part
23M: Material
24: Glass substrate (Base member)
25, 125: Imprint layer
26, 126: Wire forming groove part
29: Touchscreen (Wiring board, Position input device)
30: First substrate (Substrate)
31: Second substrate (Substrate)
32: Base member
33: Base member

The invention claimed is:

1. A wiring board comprising:
a substrate with a multi layered structure including a base member and an imprint layer that is on an outer layer side of the base member, the imprint layer including a wire defining groove portion that is recessed in a portion of an outer surface of the imprint layer;
a wire defined in the wire defining groove portion, the wire including:
an inner-layer-side wire defining portion in the wire defining groove portion and made of a first conductive material; and
an outer-layer-side wire defining portion in the wire defining groove portion and on an outer layer side relative to the inner-layer-side wire defining portion and made of a second conductive material that is higher in light absorptance than the first conductive material, an outer surface of the outer-layer-side wire defining portion is flush with an outer surface of the substrate.

2. The wiring board according to claim 1, wherein the outer-layer-side wire defining portion contains at least a carbon-based conductive material.

3. The wiring board according to claim 1, wherein the inner-layer-side wire defining portion contains at least a metal material.

4. The wiring board according to claim 1, wherein the outer surface of the outer-layer-side wire defining portion is flush with an outer surface of the imprint layer.

5. A position input function-equipped display panel comprising:
 a position input device including:
  a substrate with a multi layered structure including a base member and an imprint layer that is on an outer layer side of the base member, the imprint layer including a wire defining groove portion that is recessed in a portion of a surface of the imprint layer;
  a wire defined in the wire defining groove portion, the wire including:
   an inner-layer-side wire defining portion that is in the wire defining groove portion and made of a first conductive material and an outer-layer-side wire defining portion located in the wire defining groove portion and on an outer layer side relative to the inner-layer-side wire defining portion and made of a second conductive material and is higher in light absorptance than the first conductive material; and
  a position detecting electrode detecting, by a capacitance generated between the position detecting electrode and a position input element performing a position input in a surface of the substrate, an input position of the position input element, wherein
  the outer-layer-side wire defining portion includes an outer surface that is flush with an outer surface of the substrate, and
  the position detecting electrode is a portion of the wire,
 a first display substrate including a display surface where an image is displayed; and
 a second display substrate opposing one surface of the first display substrate, the one surface being on a side opposite to the display surface,
 wherein the first display substrate defines the substrate of the position input device and provided with the position detecting electrode on the display surface side.

6. The position input function-equipped display panel according to claim 5, wherein
 the position detecting electrode includes a plurality of first position detecting electrodes arranged in a first direction extending along the surface of the substrate, and a plurality of second position detecting electrodes arranged in a second direction extending along the surface of the substrate and crossing the first direction,
 the substrate is provided with a first connection wire connecting between adjacent ones of the first position detecting electrodes in the first direction, and a second connection wire connecting between adjacent ones of the second position detecting electrodes in the second direction and on an outer layer side relative to the first connection wire via an insulating film, and
 the second connection wire is made of a third conductive material that is higher in light absorptance than the first conductive material.

7. The position input function-equipped display panel according to claim 6, wherein the second connection wire is made of a conductive material that is identical to the second conductive material.

8. The position input function-equipped display panel according to claim 6, further comprising a peripheral wire connected to the position detecting electrode and located outside a region where the position detecting electrode is located in the surface of the substrate,
 wherein the peripheral wire is made of the third conductive material.

9. The position input function-equipped display panel according to claim 5, wherein
 the position detecting electrode includes a plurality of first position detecting electrodes arranged in a first direction extending along the surface of the substrate, and a plurality of second position detecting electrodes arranged in a second direction extending along the surface of the substrate and perpendicular to the first direction,
 the substrate is provided with a first connection wire connecting between adjacent ones of the first position detecting electrodes in the first direction and made of the wire that is identical to the first position detecting electrodes, and a second connection wire connecting between adjacent ones of the second position detecting electrodes in the second direction and made of the wire that is identical to the second position detecting electrodes, and
 the substrate includes a first substrate provided with at least the plurality of first position detecting electrodes and the first connection wire, and a second substrate provided with at least the plurality of second position detecting electrodes and the second connection wire and fixed to the first substrate having its surface where the plurality of second position detecting electrodes and the second connection wire are provided opposed to one surface of the first substrate, the one surface being on a side opposite to a surface of the first substrate where the plurality of first position detecting electrodes and the first connection wire are provided.

10. The position input function-equipped display panel according to claim 5, further comprising at least a polarizer in which the position detecting electrode is interposed between the polarizer and the first display substrate.

11. The position input function-equipped display panel according to claim 5, wherein the outer surface of the outer-layer-side wire defining portion is flush with an outer surface of the imprint layer.

12. A method of producing a wiring board, the method comprising:
 forming an inner-layer-side wire defining portion that is made of a first conductive material on a surface of a substrate; and
 forming an outer-layer-side wire defining portion, on an outer layer side relative to the inner-layer-side wire defining portion, that is made of a second conductive material that is higher in light absorptance than the first conductive material;
 forming an imprint layer on an outer layer side of a base member to form the substrate including the base member and the imprint layer; and
 forming a wire forming groove portion in a surface of the imprint layer by forming a recess in the surface of the imprint layer, wherein
 in the forming the inner-layer-side wire defining portion and in the forming the outer-layer-side wire defining portion, the inner-layer-side wire defining portion and the outer-layer-side wire defining portion are each formed in the wire forming groove portion, and after forming the inner-layer-side wire defining portion and the outer-layer-side wire defining portion in the wire forming groove portion, portions of the inner-layer-side wire defining portion and the outer-layer-side wire defining portion that are outside the wire forming groove portion are removed.

13. The method of producing a wiring board according to claim 12, wherein the first conductive material is dissolved in a solvent, and the method further comprises:

subsequent to the forming the inner-layer-side wire defining portion and preceding the forming the outer-layer-side wire defining portion, evaporating the solvent.

* * * * *